United States Patent
Young et al.

(10) Patent No.: US 7,669,035 B2
(45) Date of Patent: Feb. 23, 2010

(54) SYSTEMS AND METHODS FOR RECONFIGURABLE COMPUTING

(75) Inventors: Joshua Young, Boston, MA (US); Dianne J. Turney, Woburn, MA (US)

(73) Assignee: The Charles Stark Draper Laboratory, Inc., Cambridge, MA (US)

(*) Notice: Subject to any disclaimer, the term of this patent is extended or adjusted under 35 U.S.C. 154(b) by 325 days.

(21) Appl. No.: 11/040,177

(22) Filed: Jan. 21, 2005

(65) Prior Publication Data

US 2005/0235070 A1    Oct. 20, 2005

Related U.S. Application Data

(60) Provisional application No. 60/538,148, filed on Jan. 21, 2004.

(51) Int. Cl.
*G06F 9/00* (2006.01)
*G06F 13/00* (2006.01)

(52) U.S. Cl. .......................... 712/15; 710/104; 712/13
(58) Field of Classification Search ....................... None
See application file for complete search history.

(56) References Cited

U.S. PATENT DOCUMENTS

| | | | | |
|---|---|---|---|---|
| 5,036,473 | A * | 7/1991 | Butts et al. | 703/23 |
| 5,946,219 | A * | 8/1999 | Mason et al. | 716/16 |
| 6,021,186 | A * | 2/2000 | Suzuki et al. | 379/100.12 |
| 6,021,490 | A * | 2/2000 | Vorbach et al. | 713/100 |
| 6,046,603 | A * | 4/2000 | New | 326/38 |
| 6,255,849 | B1 * | 7/2001 | Mohan | 326/41 |
| 6,453,456 | B1 * | 9/2002 | Price | 716/16 |
| 6,487,709 | B1 * | 11/2002 | Keller et al. | 716/14 |
| 6,526,557 | B1 * | 2/2003 | Young et al. | 716/16 |
| 6,653,859 | B2 * | 11/2003 | Sihlbom et al. | 326/38 |

(Continued)

FOREIGN PATENT DOCUMENTS

DE    4416881 A1 * 11/1994

OTHER PUBLICATIONS

Two Virtex-II FPGAs Deliver Fastest, Cheapest, Best High-Perfomance Image Processing System By Tom Dillon Xcell Journal; Winter/Fall 2001.*

(Continued)

*Primary Examiner*—Henry W. H. Tsai
*Assistant Examiner*—Cheng-Yuan Tseng
(74) *Attorney, Agent, or Firm*—Goodwin Procter LLP

(57) ABSTRACT

A processing system includes a communication bus. a controller, an Input/Output ("I/O") block, and reconfigurable logic segments (e.g., reconfigurable units). Individually reconfigurable logic segments are part of a single chip. A communication bus is in electrical communication with the logic segments. A first logic segment communicates to a Second logic segment over the communication bus. Reconfiguration can partition a first logic segment into a second and a third logic segment where the smaller logic segments are in electrical communication with the communication bus. Resources are dynamically reallocated when reconfigurable units are either combined or partitioned. More specifically, both partitioning a logic segment and combining two or more logic segments can change the bus width allocated to a reconfigurable unit and the quantity of logic gates in the reconfigured unit. As a result of a reconfiguration, a logic segment's embedded resources can change. The processing system provides high chip utilization throughout the chip's operation.

23 Claims, 14 Drawing Sheets

U.S. PATENT DOCUMENTS

| | | | |
|---|---|---|---|
| 6,728,871 B1 * | 4/2004 | Vorbach et al. | 712/226 |
| 6,744,274 B1 * | 6/2004 | Arnold et al. | 326/16 |
| 6,836,842 B1 * | 12/2004 | Guccione et al. | 713/100 |
| 7,124,391 B1 * | 10/2006 | Patterson | 716/17 |
| 7,139,995 B1 * | 11/2006 | James-Roxby et al. | 326/38 |
| 7,143,418 B1 * | 11/2006 | Patterson | 719/328 |
| 7,200,735 B2 * | 4/2007 | Wang et al. | 712/33 |
| 7,219,342 B2 * | 5/2007 | Metzgen | 717/156 |
| 7,237,087 B2 * | 6/2007 | Vorbach et al. | 712/15 |
| 7,557,609 B2 * | 7/2009 | Rohe et al. | 326/41 |
| 7,573,296 B2 * | 8/2009 | Schmit et al. | 326/41 |
| 2002/0125911 A1 * | 9/2002 | Kress et al. | 326/38 |
| 2002/0157066 A1 * | 10/2002 | Marshall et al. | 716/1 |
| 2004/0049672 A1 * | 3/2004 | Nollet et al. | 713/100 |
| 2004/0103263 A1 * | 5/2004 | Colavin et al. | 712/15 |
| 2004/0249880 A1 * | 12/2004 | Vorbach | 709/200 |
| 2006/0075211 A1 * | 4/2006 | Vorbach | 712/221 |
| 2007/0050603 A1 * | 3/2007 | Vorbach et al. | 712/221 |
| 2009/0187756 A1 * | 7/2009 | Nollet et al. | 713/100 |

OTHER PUBLICATIONS

Reconfigurable FPGA Processor Romer et al. Technical Report, Feb. 2000.*

Gericota et al., On-Line Defragmentation for Run-Time Partially Reconfigurable FPGAs, 2002, ACM, LCNS 2438, pp. 302-311.*

Dyer et al., Partially Reconfigurable Cores for Xilinx Virtex, 2002, ACM, LCNS 2438, pp. 292-301.*

International Preliminary Report on Patentability for PCT/US2005/001959 dated Jul. 24, 2006.

Written Opinion for PCT/US2005/001959 dated Jul. 24, 2006.

Lim et al., XILINX Application Note: Virtex, Virtex-E, Virtex II, Virtex II Pro Families—Two Flows for Partial Reconfiguration: Module Based or Small Bit Manipulations—XAPP290 (vl. 0), May 17, 2002.

International Search Report for PCT/US2005/001959 dated Sep. 13, 2005.

Written Opinion for PCT/US2005/001959 dated Sep. 13, 2005.

* cited by examiner

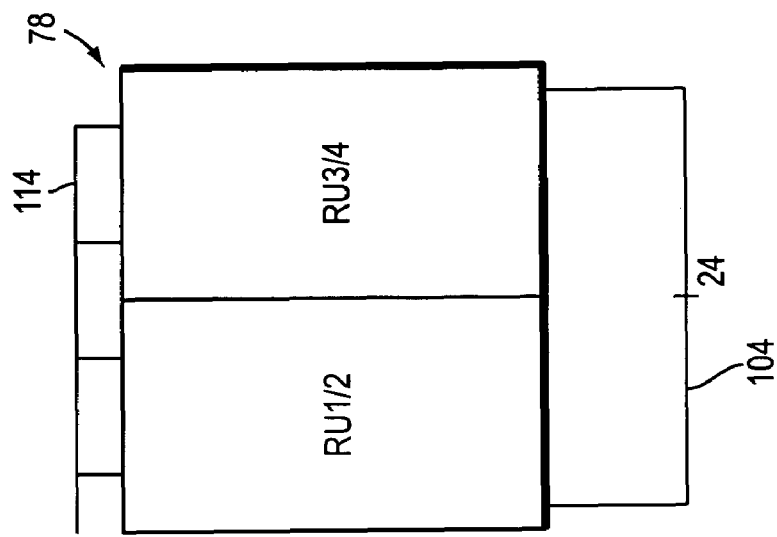
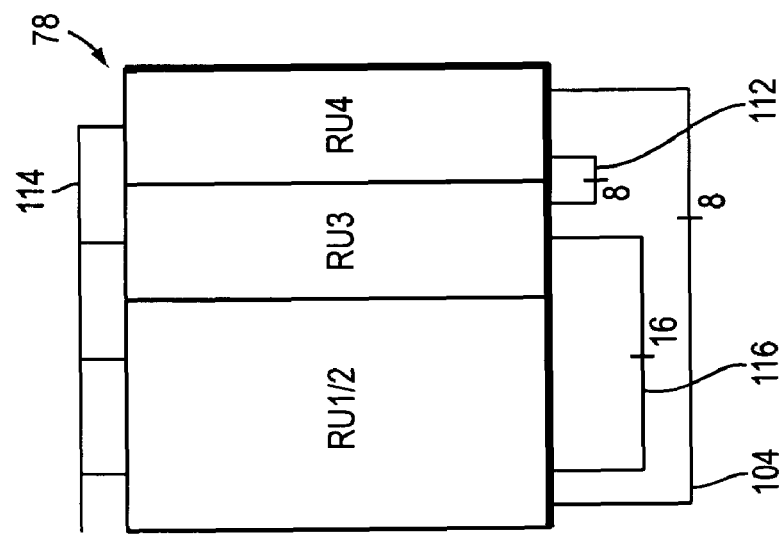
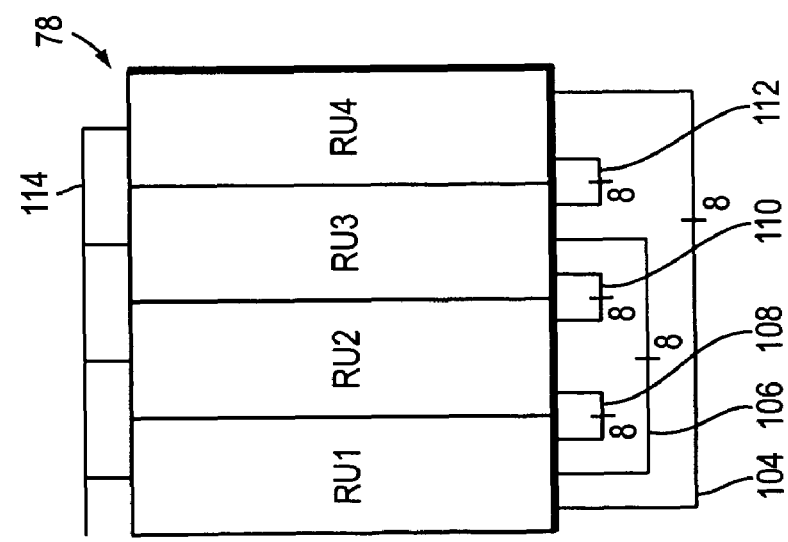

SYSTEMS AND METHODS FOR RECONFIGURABLE COMPUTING

CROSS-REFERENCE TO RELATED APPLICATION

This application claims priority to U.S. Provisional Application No. 60/538,148, filed Jan. 21, 2004, the contents of which are incorporated herein by reference.

FIELD OF THE INVENTION

The invention relates to reconfigurable computing.

BACKGROUND

A chip may embody one of a General Purpose Computer ("GPC"), an Application Specific Integrated Circuit ("ASIC"), or a Field Programmable Gate Array ("FPGA"), or a combination thereof. A GPC has fixed logic and uses software instructions to process data. An ASIC has fixed logic and processes data through functions built from hardwired gates. An FPGA has reconfigurable logic and processes data through functions built from configurable gates. In general, among the GPC, the ASIC, and the FPGA, the GPC provides the most flexibility. As a result, the GPC can be applied in the widest variety of applications. The ASIC has the best performance for specific applications but a much narrower range of applications in which it can he employed. The FPGA has good performance for specific applications and can be adapted for a variety of applications up until the time that it is deployed. More recently, FPGAs have been employed where the whole or part of the FPGA is reconfigured after the FPGA has been deployed to suit a specific application. Current designs are ineffective because, for example, they result in communication bottlenecks. Further, all of the above approaches result in inefficiencies because most logic gates on the chip are idle for significant portions of time, i.e., many logic gates have limited utility over the entire time that the chip is operating. In addition, current designs do not accommodate runtime-processing adaptation with high efficiency, i.e., these approaches do not provide high utilization of the gates on the FPGA.

Still more recent designs provide chips that are reconfigurable while being employed in an operating circuit, and go by other names (e.g., runtime reconfigurable, dynamically reconfigurable, etc.) than "FPGA." however, provided that the chip is made of gates and its functions can be reconfigured, these chips are still considered a "FPGA."

SUMMARY OF THE INVENTION

In one aspect of the invention, a processing system includes individually reconfigurable logic segments that are part of a single chip. The system also includes a communication bus in electrical communication with the logic segments. The system also includes a first logic segment a second logic segment. The first logic segment and the second logic segment communicate to one another over the communication bus. In one embodiment, the communication bus has a first bandwidth when the logic segment is in a first state and a second bandwidth when the logic segment is in a second state. In a version of this embodiment, the system also includes a controller, an I/O module and memory. The first communication bus is connected to the controller, the I/O module and the logic segments. A second communication bus is connected to the controller, the I/O module and at least one logic segment. A third communication bus is connected to at least two of the logic segments.

In another aspect, the invention provides a method for processing that employs a system. The system includes a controller, a memory, and a chip that includes a plurality of logic segments. A status signal is transmitted to the controller by a first logic segment. Configuration data for the first logic segment is pulled from memory in response to the status signal. The first logic segment is reconfigured to a first state with the configuration data. When in the first state, the first logic segment executes a processing step. In one embodiment, the logic segments are individually reconfigurable. In one embodiment, a second logic segment is reconfigured while the first logic segment executes the processing step.

In a further aspect of the invention, a multi-state apparatus includes a system. The system includes an individually reconfigurable logic segments that are part of a single chip, an I/O segment, and a controller. In one embodiment, a logic segment is in a first configuration when the apparatus is performing a first task and the logic segment is in a second configuration when the apparatus is performing a second task. A data bus is connected to the logic segments, the I/O segments, and the controller. In one version of this embodiment, the bandwidth of the data bus employed by the logic segment is greater when the logic segment is in the second configuration than when the logic segment is in the first configuration. In another version of this embodiment, the quantity of available logic gates is greater when the logic segment is in the second configuration than when the logic segment is in the first configuration.

In yet another aspect, the invention provides a method employing an application specific computer to perform multiple tasks that include a plurality of functions. A device including reconfigurable logic is provided. When the logic is in a first configuration execution of a first function and a second function is started. Upon completion of the first function, a portion of the logic is reconfigured while the second function continues to be executed. In one embodiment, a third function begins execution while the second function continues to be executed.

BRIEF DESCRIPTION OF THE DRAWINGS

FIGS. 5A, 5B and 5C are block diagrams of a reconfigurable device according to an embodiment of the invention.

DETAILED DESCRIPTION

Figure 1:
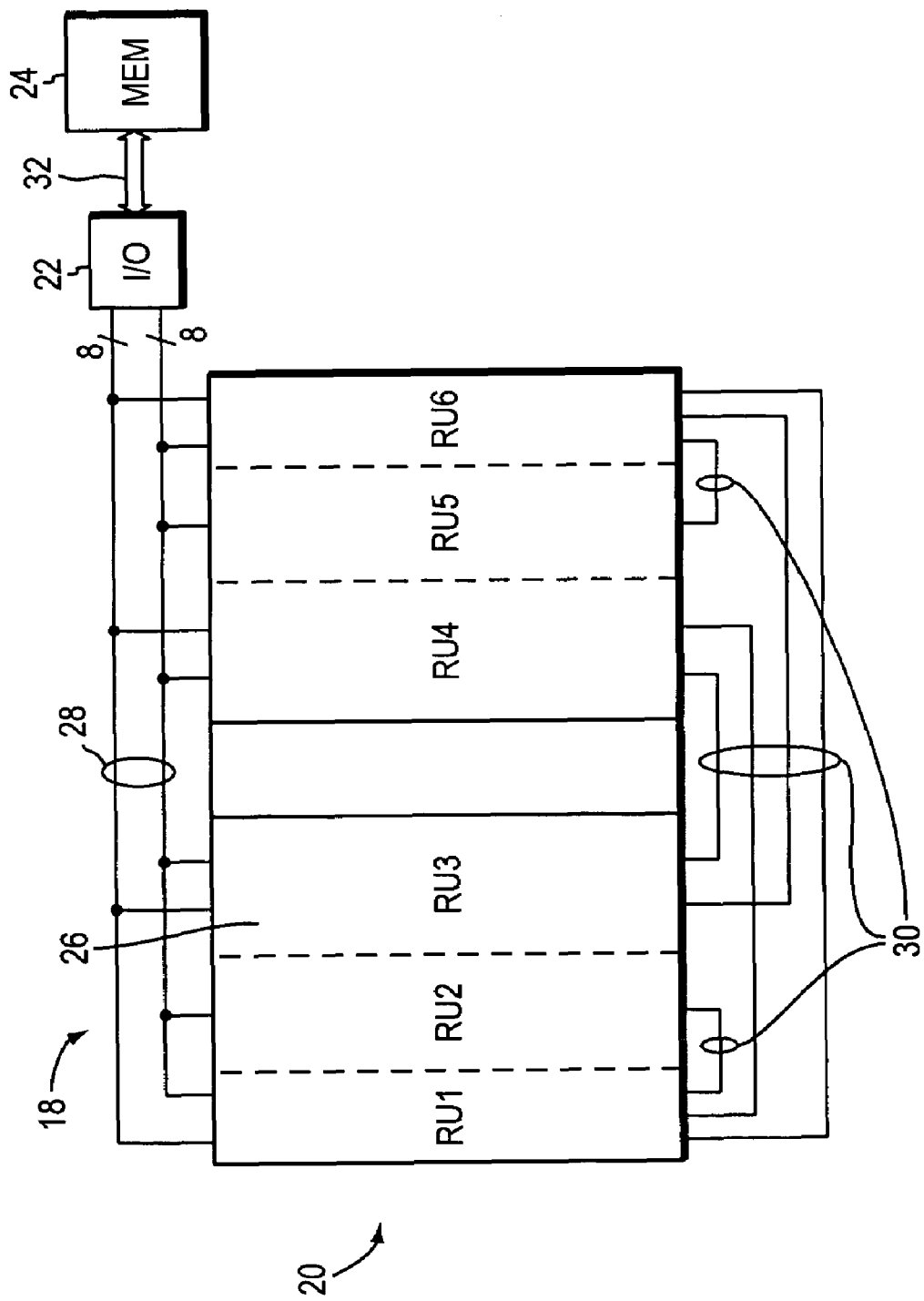
FIG. 1 is a block diagram of a system according to an embodiment of the invention.

In existing applications, single-chip FPGAs are typically reconfigured on a chip-wide basis. As a result, the smallest reconfigurable unit is the chip and not some portion of it. Each FPGA may include multiple processing elements, i.e., a set of logic gates that are logically separated from the remaining logic gates on the FPGA. Two sets of logic gates are logically separated from one another when the two sets do not share any logic gates. Even where multiple processing elements exist within a chip, however, in most current approaches, the processing elements are all reconfigured at the same time. Thus, for purposes of reconfiguration, the FPGA is not treated as having isolated sections that can be individually reconfigured. Other current approaches do include multiple reconfigurable units within the same FPGA, however, these approaches are very limited and generally ineffective. First, the current approaches provide few reconfigurable units. Second, the current approaches result in communication path bottlenecks between reconfigurable units. For example, several reconfigurable units may each have a single communication path that connects the reconfigurable unit to a common routing location. This approach limits the efficiency of the FPGA because only one reconfigurable unit can use the common routing location at any one time. The remaining reconfigurable units that are connected to the common routing location must stand idle while waiting to communicate. Further, these approaches do not allow one reconfigurable unit to directly use the resources of any other reconfigurable unit. The lack of direct access to resources results in unnecessary overhead whenever a reconfigurable unit does not have direct access to a resource it needs.

Often, applications require many specific circuit functions in order to achieve the desired performance. Current approaches have the disadvantage of requiring multiple dedicated chips for each individual circuit that is desired. This approach is disadvantageous because it increases the space required for the circuit, and consequently, the circuit's cost and the energy losses that are generated by the circuit. In an effort to reduce size, a single reconfigurable chip (FPGA) can be serially reconfigured to perform multiple circuit functions provided that the functions are not needed simultaneously by the application. Such an approach is disadvantageous because processing will take longer unless the overall processing system is efficiently designed. Because of the difficulties in developing an efficient overall processing system using such an approach, high energy consumption and performance degradation typically result. These are significant drawbacks in the many applications where, for example, space is limited and/or power conservation is critical, e.g., hand held devices, autonomous robotics, etc.

Additionally, the above approaches do not optimally allocate resources during runtime because independently-reconfigurable units cannot be combined or partitioned. More specifically, the above approaches do not provide an optimum distribution of processing hardware.

Another approach attempts to create reconfigurable circuits by interconnecting chips via external busses which have routing that can be modified during operation, i.e. modifying the routing path during runtime. This approach suffers from routing pipeline cycle delay or latency and an inability to dynamically reallocate resources. More specifically, communication cannot occur when a bus routing is being changed.

FIG. 1 provides an overview of one embodiment of a system 18 for reconfigurable computing. The system 18 includes a chip 20, an input/output ("I/O") module 22 and a memory module 24. The chip 20 includes six reconfigurable units RU1-RU6 and a controller 26. In one embodiment, the chip is an FPGA. In a version of that embodiment, the chip 20 is a XILINX VIRTEX FPGA. A first communication bus 28 connects the reconfigurable units RU1-RU6 to the I/O module 22. A second communication bus 30 connects the reconfigurable units RU1-RU6 to one another. In FIG. 1, the second communication bus 30 is shown external to the chip 20, however, in another embodiment, the second communication bus 30 is internal to the chip 20. A third communication bus 32 connects the I/O module 22 to the memory module 24. In one embodiment, the I/O module 22 shown in FIG. 1 is static because it cannot be reconfigured. Further, although the memory module 24 and I/O module 22 are external to the chip 20 as shown in FIG. 1, additional embodiments can provide either or both of memory module 24 and I/O module 22 embedded in the chip 20. In one embodiment, there is no memory module 24 external to the chip 20. The bus connections to the controller 26 are not depicted in FIG. 1, however, they will be described in detail herein. In one embodiment, the first communication bus 28 and the second communication bus 30 are 16-bit busses that operate at 66 MHz.

In one embodiment, the system 18 shown in FIG. 1 includes a chip 20 with multiple segments including six individually reconfigurable units RU1-RU6. Each reconfigurable unit is a block of reconfigurable hardware, e.g., logic gates. In addition, as will be discussed herein, the chip 20 may contain static (i.e., non-reconfigurable) hardware, for example, multipliers, RAM, I/O, etc. The individually reconfigurable units need not be the same size. In one embodiment, each reconfigurable unit RU1-RU6 includes a column on the chip. Each column includes frames which are addressable groups of configuration bits. Each column also includes one or more control logic blocks made up of a plurality of frames. For example, in a version of this embodiment, RU1 and RU6 include 330 frames, RU2 and RU5 include 352 frames, and RU3 and RU4 include 462 frames. The size of a reconfigurable unit can effect the reconfiguration time for the unit (i.e., the time that it takes to reconfigure the reconfigurable unit).

Each of the reconfigurable units RU1-RU6 may be combined with adjacent reconfigurable units. For example, in FIG. 1, RU2 may be combined with RU3 to create a larger reconfigurable unit RU2/3. Further, RU2/3 may be combined with RU1 to create an even larger reconfigurable unit, i.e., RU1/2/3. One advantage provided by the system 18 of FIG. 1 is that reconfiguration of a first reconfigurable unit does not affect the operation of a second reconfigurable unit when the second reconfigurable unit is not involved in the reconfiguration. In other words, while RU2 and RU3 are being combined to create RU2/3 each of the reconfigurable units RU1, RU4, RU5, and RU6 can continue to operate uninterrupted, i.e., the reconfigurable units RU1-RU6 can be reconfigured at runtime.

Regardless of whether the I/O module 22 is located internal or external to the chip 20, the I/O module 22 allows an exchange of data between itself and the reconfigurable units RU1-RU6 and memory module 24.

Figure 2:
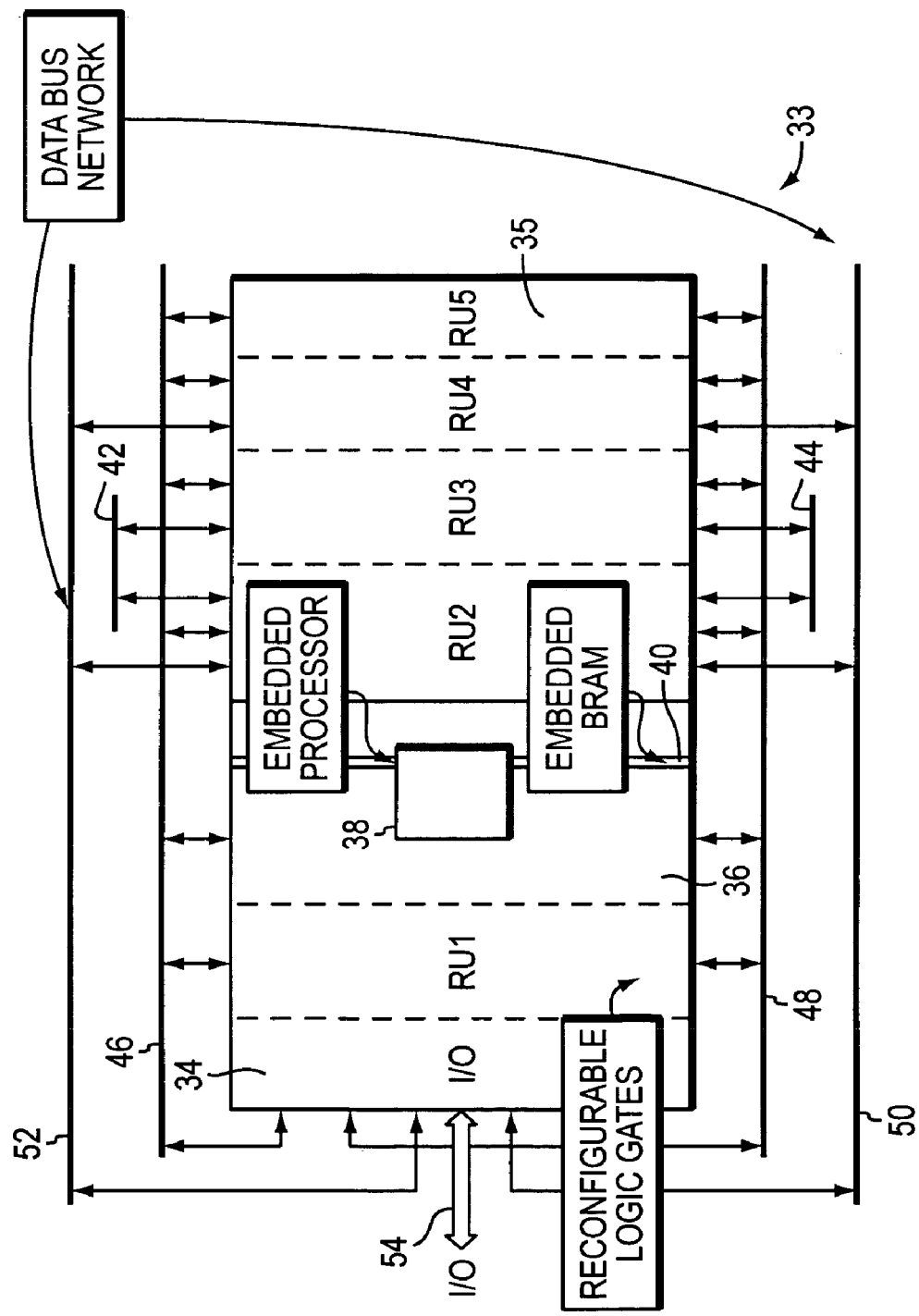
FIG. 2 is a block diagram of a system according to an embodiment of the invention.

Referring now to FIG. 2, a more detailed view of a system 33 according to an embodiment of the invention is shown. A chip 35 includes multiple segments including I/O 34 (e.g., an I/O module), a controller 36, and individually reconfigurable logic segments RU1-RU5. In one embodiment, the I/O 34 is a logic segment. A processor 38 and a buffer random access memory ("BRAM") 40 (e.g., a memory module) are embedded in the chip 35. In one embodiment, the system 18 includes a master/slave architecture where the controller 36 operates as a master and the reconfigurable units RU1-RU5 operate as slaves. In a version of this embodiment, the master controls communication on the data busses and the reconfiguration of the reconfigurable units. This embodiment may also include one or more static (i.e., non-reconfigurable) slaves, e.g., I/O interface, memory controller, etc. Control signals are sent from the master to the slaves to indicate, for example, when a reconfigurable unit should receive data, transmit data, and what to do with its data. The connections for communication of control signals between the controller and the reconfigurable units are not shown in FIG. 2, but will discussed in detail herein.

The embodiment shown in FIG. 2 includes the following communication busses: 1) first local data bus 42; 2) a second local data bus 44; 3) a first common data bus 46; 4) a second common data bus 48; 5) a first I/O data bus 50; and, 6) a second I/O data bus 52. Each of the first local data bus 42 and the second local data bus 44 connect reconfigurable units RU1-RU5 to each other. For example, in FIG. 2, reconfigurable units RU2 and RU3 are connected to the first local data bus 42 and the second local data bus 44. In one embodiment, static slaves are also connected to a local data bus. The controller 36 is connected to one or more of the reconfigurable units RU1-RU5 by the common data busses 46, 48. In one embodiment, the common data busses 46 and 48 are connected to both a reconfigurable unit (e.g., RU1-RU5) and static slaves (e.g., I/O 34). In a version of this embodiment, the common data busses 46, 48 are connected to each reconfigurable unit RU1-RU5 and each static slave located on the chip 35. The I/O data busses 50, 52 connect the I/O 34 to one or more of the reconfigurable units RU1-RU5. In one embodiment, the I/O 34 is connected to each of the reconfigurable units RU1-RU5 and the controller 36 located on the chip 35.

The clock inputs are not shown for the FPGA in FIG. 2. In one embodiment, a clock input is connected to the chip 35 on a specific pin. In a version of this embodiment, the clock signal is then distributed to all the logic on the chip 35. In another embodiment, the clock input is considered one of the control signals.

As will be discussed in greater detail herein, the architecture shown in FIG. 2 is scalable. For example, the bus architecture shown in FIG. 2 may be applied to either a single chip 35 or multiple chips each including one or more reconfigurable units RU1-RU5. Where a single chip 35 is employed, the communication busses 42, 44, 46, 48, 50, and 52 can be internal to the chip 35, e.g., interconnected within the silicon device. Further, in one embodiment, the reconfigurable computing architecture includes a combination of chips configured with internal communication busses and chips employing external communication busses.

Data communication over the busses can be implemented as a multi-bit bus interconnect, or alternatively, as serial interconnects. The size of a multi-bit bus (i.e., its bandwidth) can be any size from 2-bits up to any bus width up to the maximum number of RU bus signal lines attached to that RU. The operating speed of the communication busses can vary. Generally, however, the local data busses 42, 44 have fewer connections per wire than the common data busses 46, 48. As a result, the speed of the local data busses 42, 44 typically is greater than the speed of the common data busses 46, 48. For example, in one embodiment, the local data busses 42, 44 operate at 300 MHz and the common data busses 46, 48 operate 30 MHz. In a version of this embodiment, the I/O data busses 50, 52 operate at 300 MHz. In one embodiment, the reconfigurable units RU1-RU5 connect to the communication busses through 3-state buffers. To prevent reconfiguration from disrupting operation of the communications busses 42, 44, 46, 48, 50, and 52, the buffers disconnect a reconfigurable unit RU1-RU5 from the communication during the period starting just before the reconfiguration of the reconfigurable unit begins and ending just after the reconfiguration of that unit is complete. Once the reconfiguration is complete, the reconfigured unit can immediately begin doing work and communicating even while any other reconfigurable unit RU1-RU5 is being reconfigured.

The I/O 34 is connected to circuitry that is external to the chip 35 by bus 54. In versions of each of the embodiments described above, the controller 36 is located external to the chip 35.

Figure 3B:
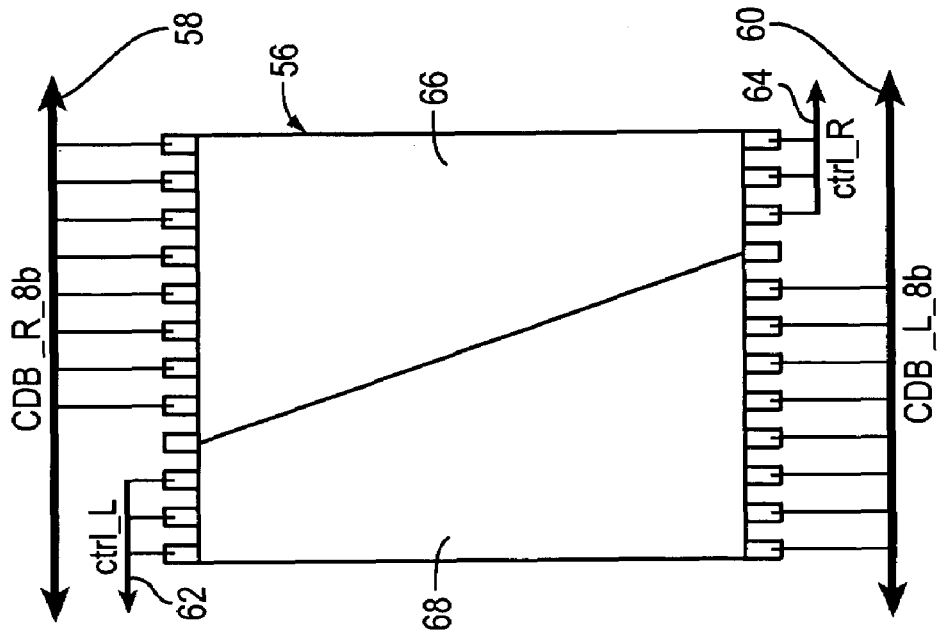
FIGS. 3A and 3B are diagrams of a reconfigurable device according to an embodiment of the invention.
Figure 3A:
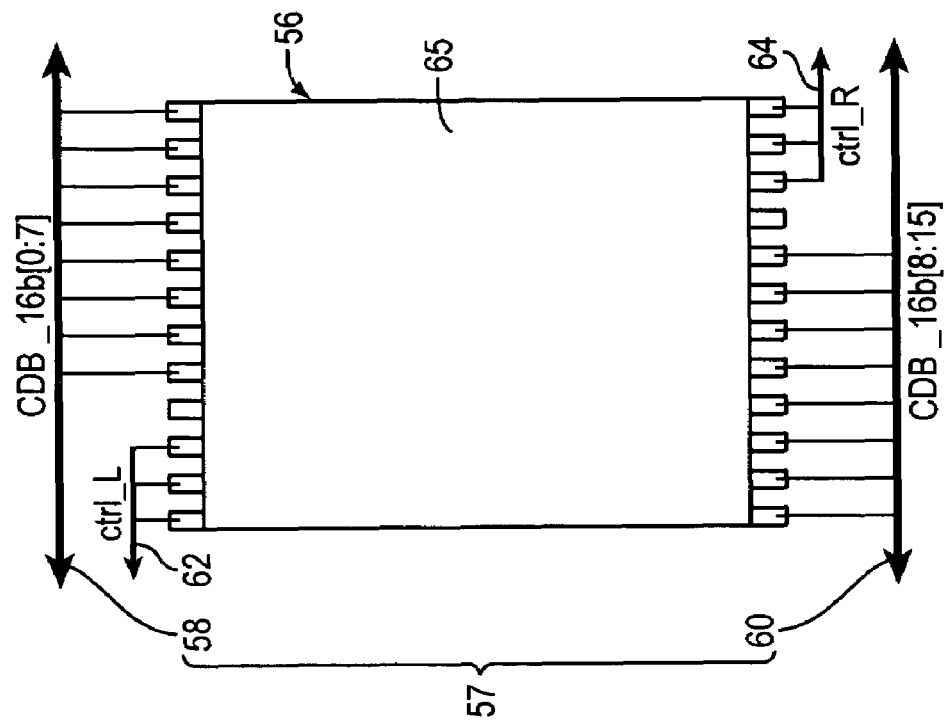

The architecture described above, results in a system that can be used to dynamically reallocate system resources. Generally, dynamic resource reallocation is achieved when reconfigurable units are either combined or partitioned. More specifically, a combination or partitioning can change the bus width allocated to a reconfigurable unit as well as the quantity of logic gates in the reconfigured unit. Other attributes of the reconfigurable units can also be reallocated. For example, communication bus wires, embedded resources such as RAM or processors, and reconfigurable logic gates. Referring now to FIGS. 3A and 3B, the effect of reconfiguration on bus allocation and logic allocation is seen in greater detail. FIG. 3A depicts a reconfigurable device 56 in a first state where the device 56 is connected to a 16-bit common data bus 57. The common data bus 57 includes a first common data bus 58 of 8-bits and a second common data bus 60 also of 8-bits. A first control bus 62 and a second control bus 64 are also connected to the reconfigurable device 56. The reconfigurable device 56 of FIG. 3A receives control signals from a controller (not shown) via the control busses 62, 64. In a version of this embodiment, only one of the two control busses 62, 64 is used.

As described above, when reconfigurable device 56 is in a first state, a 16-bit common data bus 57 is allocated to a reconfigurable unit 65. In FIG. 3B, however, a second state of the reconfigurable device 56 is shown where it is partitioned into a first reconfigurable unit 66 and a second reconfigurable unit 68. As a result, the bus allocated to reconfigurable device 56 is now split with 8-bits of bus allocated to first reconfigurable unit 66, and 8-bits of bus allocated to second reconfigurable unit 68. Thus, instead of the single reconfigurable unit 65 shown in FIG. 3A, the configuration shown in FIG. 3B provides two reconfigurable units each with a smaller communication bus bandwidth than the communication bus bandwidth shown in FIG. 3A. In addition to the bus reallocation that occurs when the reconfigurable device 56 is reconfigured, the logic is also reallocated. For example, because the reconfigurable device 56 has been partitioned roughly in half in FIG. 3B, each of the first reconfigurable unit 66 and the second reconfigurable unit 68 have approximately half of the logic that was included in the reconfigurable unit 65. In general, partitioning as shown in FIG. 3B can continue for a reconfigurable device (e.g., a chip) provided that a connection is maintained between each reconfigurable unit 66, 68 and both a communication bus 58, 60 and a control bus 62, 64. In one embodiment, a connection to a clock signal is also required for each reconfigurable unit 66, 68. In one embodiment, each reconfigurable unit 66, 68 has a fixed width. The type of partitioning described above is particularly suited to applications that require small multi-function processing blocks.

Figure 4:
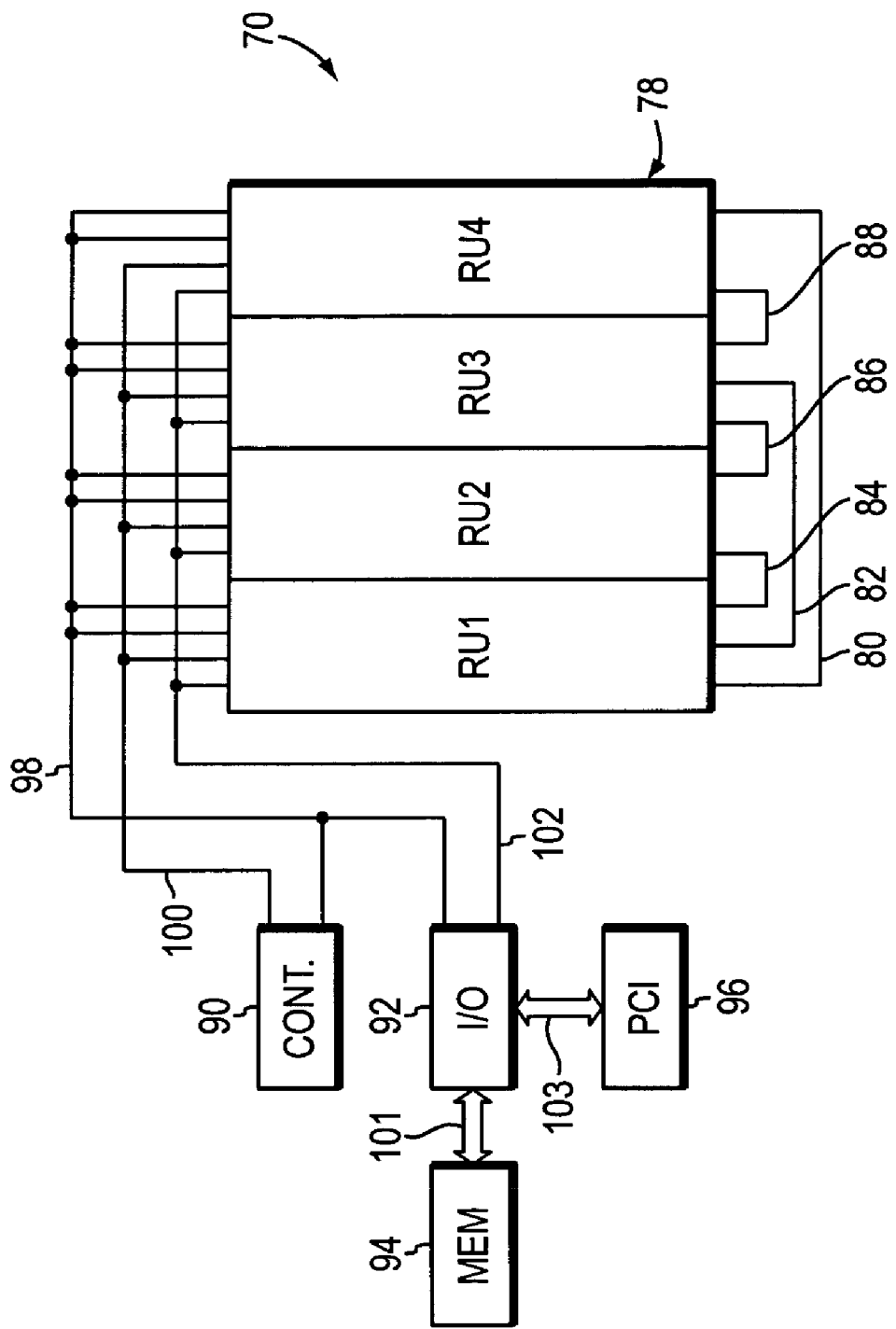
FIG. 4 is a block diagram of a system according to an embodiment of the invention.

Referring now to FIG. 4, a block diagram of another embodiment of a system 76 for reconfigurable computing is shown. The system includes a chip 78 with four segments, i.e., reconfigurable units RU1, RU2, RU3, and RU4. Five local data busses connect the reconfigurable units RU1, RU2, RU3, and RU4 to one another. A first local data bus 80 connects RU1 to RU4, a second local data bus 82 connects RU1 to RU3, a third local data bus 84 connects RU1 to RU2, a fourth local data bus 86 connects RU2 to RU3, and a fifth local data bus connects RU3 to RU4. In the embodiment shown in FIG. 4, the local data busses 80, 82, 84, 86, and 88 can either be external to the chip 78 (as shown) or internal to the chip. The system includes a controller 90, I/O 92, a memory 94, and a peripheral component interconnect ("PCI") 96. As shown in FIG. 4, the controller 90, I/O 92, and memory 94 are located external to the chip 78. Each of the controller 90, I/O 92, and memory 94 can, however, be located as part of the chip 78. For example, the controller 90 and the I/O 92 can be segments of the chip 78. A control bus 98 connects the controller 90 to the I/O 92 and each reconfigurable unit RU1, RU2, RU3, and RU4. A common data bus 100 connects the controller 90 to each reconfigurable unit RU1, RU2, RU3, and RU4. An I/O data bus 102 connects the I/O 92 to each reconfigurable unit RU1, RU2, RU3, and RU4. Where the controller 90 and I/O 92 are integral to the chip 78, each of the control bus 98, the common data bus 100, and the I/O data bus 102 can also be part of the chip 78. In one embodiment, each of the system busses 80, 82, 84, 86, 88, 98, 100, and 102 are static because their connections are not reconfigurable. Data is transmitted between the I/O 92 and the memory 94 via communication bus 101. Further, data is transmitted between the I/O 92 and the PCI 96 via PCI communication bus 103.

In one embodiment, the controller 90 is a master controller and each of the I/O 92 and the reconfigurable units RU1, RU2, RU3, and RU4 are slaves. In a version of this embodiment both the controller 90 and the I/O 92 are static (i.e., non-reconfigurable). Where a master/slave architecture is employed, the controller 90 controls reconfiguration and data flow on each of the busses 80, 82, 84, 86, 88, 98, 100, and 102. For example, each reconfigurable unit RU1, RU2, RU3, and RU4 has a set of control signals between itself and the controller 90. In a version of this embodiment, the control signals include a command signal, a response signal, and an interrupt signal. The command signal instructs the reconfigurable unit what it should do (e.g., reconfigure to a different state, transmit data, receive data, etc.). The response signal is the reconfigurable unit's acknowledgement of having received the command signal. The reconfigurable unit may also assert the interrupt signal, for example, when it has completed an assigned task, e.g., reconfiguration, processing data, etc. Of course, depending on the protocol being implemented, any control signal can be used provided that it is both capable of being transmitted across the control bus 98 and capable of being interpreted by the reconfigurable units RU1, RU2, RU3, and RU4 or I/O 92.

In one embodiment, the controller sends each of the I/O 92 and the reconfigurable units RU1, RU2, RU3, and RU4 a control signal including processing instructions, for example, when to receive data, when to transmit data, and what to do with the unit's data. More specifically, the controller 90 is made aware of the status of a reconfigurable unit RU1-RU4 by a status signal from the reconfigurable unit (e.g., an interrupt signal, a response signal). In response, the controller 90 pulls the configuration data for the reconfigurable unit, e.g., RU1-RU4, from memory 94. In one embodiment, the configuration data is embodied as configuration bits. In a version of this embodiment, the configuration data is placed on the common data bus 100. When the reconfigurable unit RU1-RU4 has completed a first assignment, the controller 90 initiates reconfiguration of the unit to another state. i.e., a second configuration. Typically, the second configuration corresponds to a second assignment to be completed by the reconfigurable unit RU1-RU4. Thus, the controller 90 can first direct data to the reconfigurable unit for processing by the unit. In addition, the controller 90 directs the reconfigurable unit to place its data on a data bus (e.g., I/O data bus 102) upon completion of the second assignment.

In an alternative embodiment a master/slave architecture is not used. Instead, the I/O 92 and the reconfigurable units RU1, RU2, RU3, and RU4 arbitrate for bus availability. In this alternative embodiment, the modules (e.g., I/O 92 and reconfigurable units RU1, RU2, RU3, and RU4) connected to the bus (e.g., I/O data bus 92, local data busses 80, 82, 84, 86, and 88) control the flow of data. In a version of this embodiment, the controller 90 is only used for initiating reconfiguration of the reconfigurable units RU1, RU2, RU3, and RU4. In addition, the modules connected to the bus, e.g., I/O 92 and reconfigurable units RU1, RU2, RU3, and RU4, may arbitrate for the bus and then request reconfiguration by the controller 90.

In one embodiment, each of the local data busses 80, 82, 84, 86, and 88 are 16-bit data busses. In another embodiment, the local data busses 80, 82, 84, 86, and 88 are 8-bit data busses. Generally the local data busses are faster than the common data bus because they have fewer connections. In one embodiment, the local data busses 80, 82, 84, 86, and 88 are 16-bit busses operating at 100 MHz, the common data bus 100 is a 16-bit bus operating at 66 MHz, and the I/O data bus 102 is a 16-bit bus operating at 66 MHz. In one embodiment, the system 76 includes a common data bus 100, but does not include any of the local data busses 80, 82, 84, 86, and 88.

As initially mentioned with reference to FIGS. 3A-3C, one of the advantages of the systems shown in FIGS. 1, 2, and 4 is the ability to dynamically reallocate resources by reconfiguring the reconfigurable units RU1, RU2, RU3, and RU4. FIGS. 5A-5C provide a more detailed view of the resource re-allocation that occurs in one embodiment when one or more reconfigurable units change state. In FIGS. 5A-5C, a chip 78 includes multiple reconfigurable units, e.g., RU1, RU2, RU3, and RU4. In FIGS. 5A-5C, the controller and the control bus are not shown.

In FIG. 5A, RU1, RU2, RU3, and RU4 are configured in a state where they are separate from one another. Further, five 8-bit local data busses connect the reconfigurable units to one another. A first local data bus 104 connects RU1 to RU4, a second local data bus 106 connects RU1 to RU3, a third local data bus 108 connects RU1 to RU2, a fourth local data bus 110 connects RU2 to RU3, and a fifth local data bus 112 connects RU3 to RU4. A common data bus 114 connects each of the reconfigurable units RU1-RU4 to a controller. RU1 has a single 8-bit data bus 106 that connects RU1 to RU3. Thus, as configured in FIG. 5A RU1 cannot communicate to RU3 over a local data bus larger than 8-bits. Should RU1 need to communicate with RU 3 over a larger bus, however, it is possible to reconfigure RU1 to a second state that results in the allocation of a 16-bit bus between RU1 and RU3. For example, in FIG. 5B, adjacent reconfigurable units RU1 and RU2 are combined to form a single reconfigurable unit RU1/2. As a result, the second local data bus 106 and the fourth local data bus 110 are combined to form a first combined local data bus 116. Because both the second local data bus 106 and fourth local data bus 110 are 8-bit busses, the first combined local data bus is a 16-bit bus. In one embodiment, the local data bus is a fixed hardwired bus. Communication bandwidth for a reconfigurable unit (e.g., RU1, RU3, etc.) is changed as a result of reconfiguration when the new configuration provides the reconfigurable unit with an increase or decrease in the communication bus connections available to it. Reconfigurable unit RU1/2 can be maintained in that state so long as it is required. Of course, RU1/2 can also be reconfigured to return to the configuration shown in FIG. 5A if necessary.

Additionally, the remaining reconfigurable units (e.g., RU3 and RU4) can also be reconfigured if required by the processing tasks that they are assigned. For example, if RU4 needs to communicate with RU1 over a larger data bus, e.g., 24-bits, it can be combined with RU3 in order to do so. As shown in FIG. 5C, reconfigurable units RU1 and RU2 remain in a state where they are configured to form RU1/2. In FIG. 5C, however, adjacent reconfigurable units RU3 and RU4 are combined to form a reconfigurable unit RU3/4. As a result, the first local data bus 104 and the first local combined data bus 116 are combined to form a second combined local data bus 118. Because the first local data bus 104 is an 8-bit bus and the second combined local data bus 116 is a 16-bit bus, the second combined local data bus is a 24-bit bus.

Figure 6A:
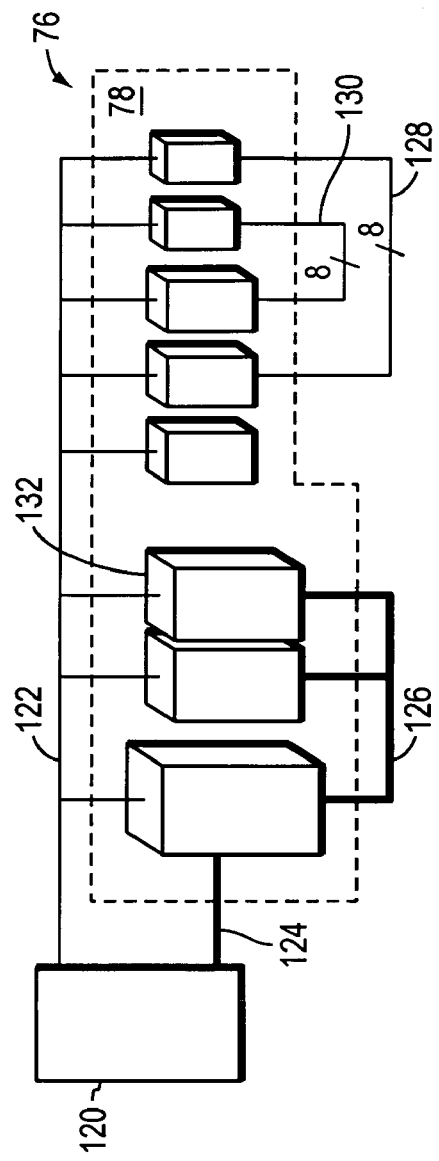
FIGS. 6A and 6B are block diagrams of a system according to an embodiment of the invention.
Figure 6B:
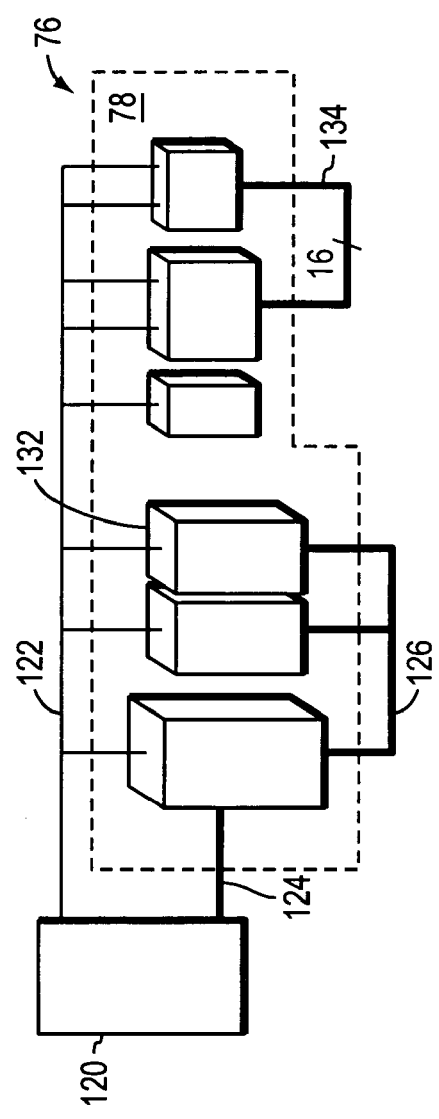

The reallocation of bus resources is also shown in FIGS. 6A and 6B. FIG. 6A depicts a system 76 at a first point in time. The system includes a chip 78 with eight reconfigurable units RU1-RU8, a controller 120, a common data bus 122, an I/O data bus 124, a first local data bus 126, a second local data bus 128, and a third local data bus 130. The common data bus connects the controller 120 to each of the reconfigurable units RU1-RU8. The I/O data bus 124 connects the controller 120 to reconfigurable unit RU1. The first local data bus 126 connects reconfigurable units RU1, RU2, and RU3. The second local data bus 128 connects reconfigurable unit RU5 to reconfigurable unit RU8. The third local data bus 130 connects reconfigurable unit RU6 to reconfigurable unit RU7. In one embodiment, each of the data busses 122, 124, 126, 128, and 130 are multi-bit busses. In a version of this embodiment, the second local data bus 128 and the third local data bus 130 are 8-bits in size. An embedded resource 132 is also included in reconfigurable unit RU3 shown in FIG. 6A. In one embodiment, the embedded resource 132 is a hardware element, for example, a processor core.

Referring now to FIG. 6B, the system 76 is shown at a later point in time. In FIG. 6B, adjacent reconfigurable unit RU5 has been combined with reconfigurable unit RU6 to form a first combined reconfigurable unit RU5/6. Adjacent reconfigurable unit RU7 has also been combined with reconfigurable unit RU8 to form a second combined reconfigurable unit RU7/8. In addition, the second local data bus 128 and the third local data bus 130 have been combined to form a first combined local data bus 134. Because each of the second local data bus 128 and the third local data bus 130 are 8-bits in size, the resulting first combined local data bus 134 is 16-bits in size. Thus, reconfiguration has resulted in a change in the bandwidth of the local data bus 134 because of the change in the quantity of communication-bus connections available to the reconfigurable units. In one embodiment, the local data bus is a fixed hardwired bus.

In one embodiment, the following steps occur in order to implement the bus reallocation shown in FIG. 6B. The system 76 recognizes that RU5 needs to communicate to RU8 over a 16-bit bus. The system 76 also recognizes that RU6 and RU7 are not presently in use, or are performing functions that have a lower priority. The controller 120 initiates the reconfigurations such that adjacent reconfigurable units RU5 and RU6 are combined and adjacent reconfigurable units RU7 and RU8 are also combined. As described above, a 16-bit bus results from the reconfiguration. The reconfigurable unit RU5, as part of first combined reconfigurable unit RU5/6, then employs the 16-bit data path between it and RU7 while RU7 is part of the second combined reconfigurable unit RU7/8.

Figure 7:
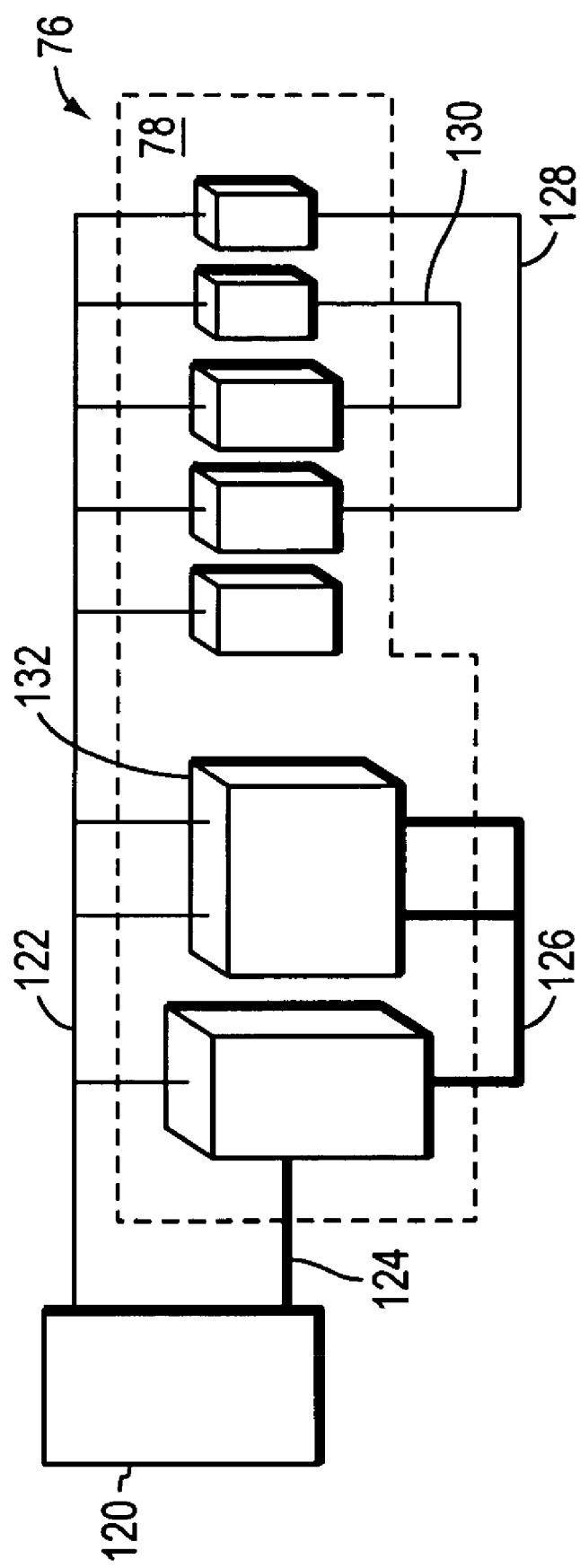
FIG. 7 is a block diagram of a system according to an embodiment of the invention.

Reconfiguration can also be used to reallocate other hardware resources, i.e., resources other than data bus connections. For example, FIG. 7 shows an embodiment that employs the system 76 originally shown in FIG. 6A to reallocate the embedded resource 132. More specifically, adjacent reconfigurable units RU2 and RU3 are combined to form a combined reconfigurable unit RU2/3. In one version of this embodiment, the reconfiguration shown in FIG. 7 is performed because RU3, by itself does not have enough available logic gates to employ the embedded hardware 132. The following steps occur in order to implement the hardware reallocation shown in FIG. 7. The system 76 recognizes that RU3 requires additional logic gates to employ the embedded hardware 132. The system also recognizes that RU2 is available. RU2 and RU3 are reconfigured into a combined reconfigurable unit RU2/3. Reconfigurable unit RU3 then employs the embedded resource 132 as required.

As mentioned above, the embodiments previously described herein are scalable such that a system can employ multiple chips. For example, in FIG. 8, a block diagram of an embodiment of a system 134 for reconfigurable computing is shown. The system 134 includes a first chip 136, a second chip 138, a third chip 140, and a fourth chip 142. Each chip can include multiple reconfigurable units. In the embodiment shown, for example, each chip 136, 138, 140, 142 includes two reconfigurable units. The first chip 136 includes reconfigurable units RU1 and RU2. The second chip 138 includes two reconfigurable units RU3 and RU4. The third chip 140 includes two reconfigurable units RU5 and RU6. The fourth chip 142 includes two reconfigurable units RU7 and RU8. Six local data busses provide a variety of connections between reconfigurable units RU1-RU8. A first local data bus 144 connects reconfigurable unit RU1 to reconfigurable unit RU5. A second local data bus 146 connects reconfigurable unit RU2 to reconfigurable unit RU3. A third local data bus 148 connects reconfigurable unit RU4 to reconfigurable unit RU8. A fourth local data bus 150 connects reconfigurable unit RU6 to reconfigurable unit RU7. A fifth local data bus 152 connects reconfigurable unit RU2 to reconfigurable unit RU7. A sixth local data bus 154 connects reconfigurable unit RU2 to reconfigurable unit RU7. A seventh local data bus 156 connects reconfigurable units RU7 and RU8 located within the fourth chip 142. The local data bus 156 can either be external to the fourth chip 142 (as shown) or internal to the fourth chip 142.

Figure 8:
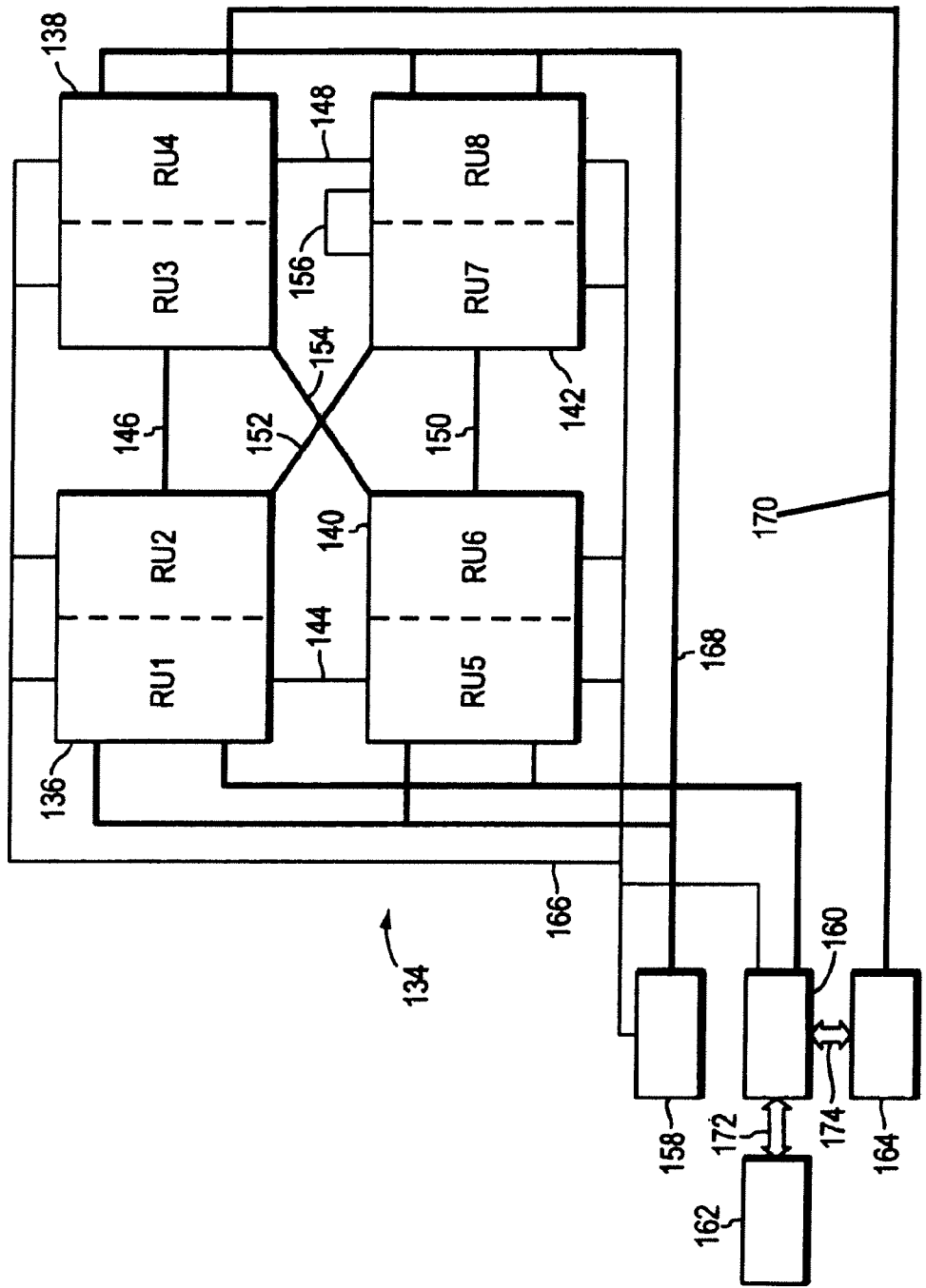
FIG. 8 is a block diagram of a multi-chip system according to an embodiment of the invention.

The system 134 includes a controller 158, I/O 160, a memory 162, and a PCI 164. In one embodiment, each chip 136, 138, 140, and 142 includes internal I/O and internal memory in addition to the I/O 160 and memory 162. A control bus 166 connects the controller 158 to the I/O 160 and each reconfigurable unit RU1-RU8. A common data bus 168 connects the controller 158 to each chip 136, 138, 140, and 142. More specifically, the common data bus 168 connects the controller 158 to the reconfigurable units RU1, RU4, RU5, and RU8. An I/O data bus 170 connects the I/O 160 to each chip 136, 138, 140, and 142. As shown in FIG. 8, the common data bus 168 connects the controller 158 to the reconfigurable units RU1, RU4, RU5, and RU8. In one embodiment, the common data bus 168 and the I/O data bus 170 are connected to each reconfigurable unit RU1-RU8 in the system 134. In one embodiment, each of the local data busses 144, 146, 148, 150, 152, 154, and 156 are 16 bit busses that operate at 100 MHz. In a version of this embodiment, the common data bus 168 and the I/O data bus 170 are 16-bit busses that operate at 66 MHz. In one embodiment, the system 134 includes a common data bus 168, but does not include any of the local data busses 144, 146, 148, 150, 152, 154, and 156.

Data is transmitted between the I/O 160 and the memory 162 via communication bus 101. Further, data is transmitted between the I/O 160 and the PCI 164 via PCI communication bus 174.

In one embodiment, the controller 158 is a master controller and each of the I/O 160 and the reconfigurable units RU1-RU8 are slaves. Where a master/slave architecture is employed, the controller 158 controls reconfiguration and data flow on each of the busses 144, 146, 148, 150, 152, 154, 156, 168, and 170. For example, each reconfigurable unit RU1-RU8 has a set of control signals between itself and the controller 158. In a version of this embodiment, the control signals include a command signal, a response signal, and an interrupt signal. The command signal instructs the reconfigurable unit what it should do (e.g., reconfigure to a different state, transmit data, receive data, etc.). The response signal is the reconfigurable unit's acknowledgement of having received the command signal. The reconfigurable unit may also assert the interrupt signal, for example, when it has completed an assigned task, e.g., reconfiguration, processing data, etc.

In an alternative embodiment, a master/slave architecture is not used. Instead, the I/O 160 and the reconfigurable units RU1-RU8 arbitrate for bus availability. In this alternative embodiment, the modules (e.g., I/O 160 and reconfigurable units RU1-RU8) connected to the bus (e.g., common data bus 168, I/O data bus 170, and local data busses 144, 146, 148, 150, 152, 154, and 156) control the flow of data. In aversion of this embodiment, the controller 158 is only used for initiating reconfiguration of the reconfigurable units RU1-RU8. In addition, the modules connected to the bus, e.g., I/O 160 and reconfigurable units RU1-RU8, may arbitrate for the bus and then request reconfiguration by the controller 158.

Figure 9:
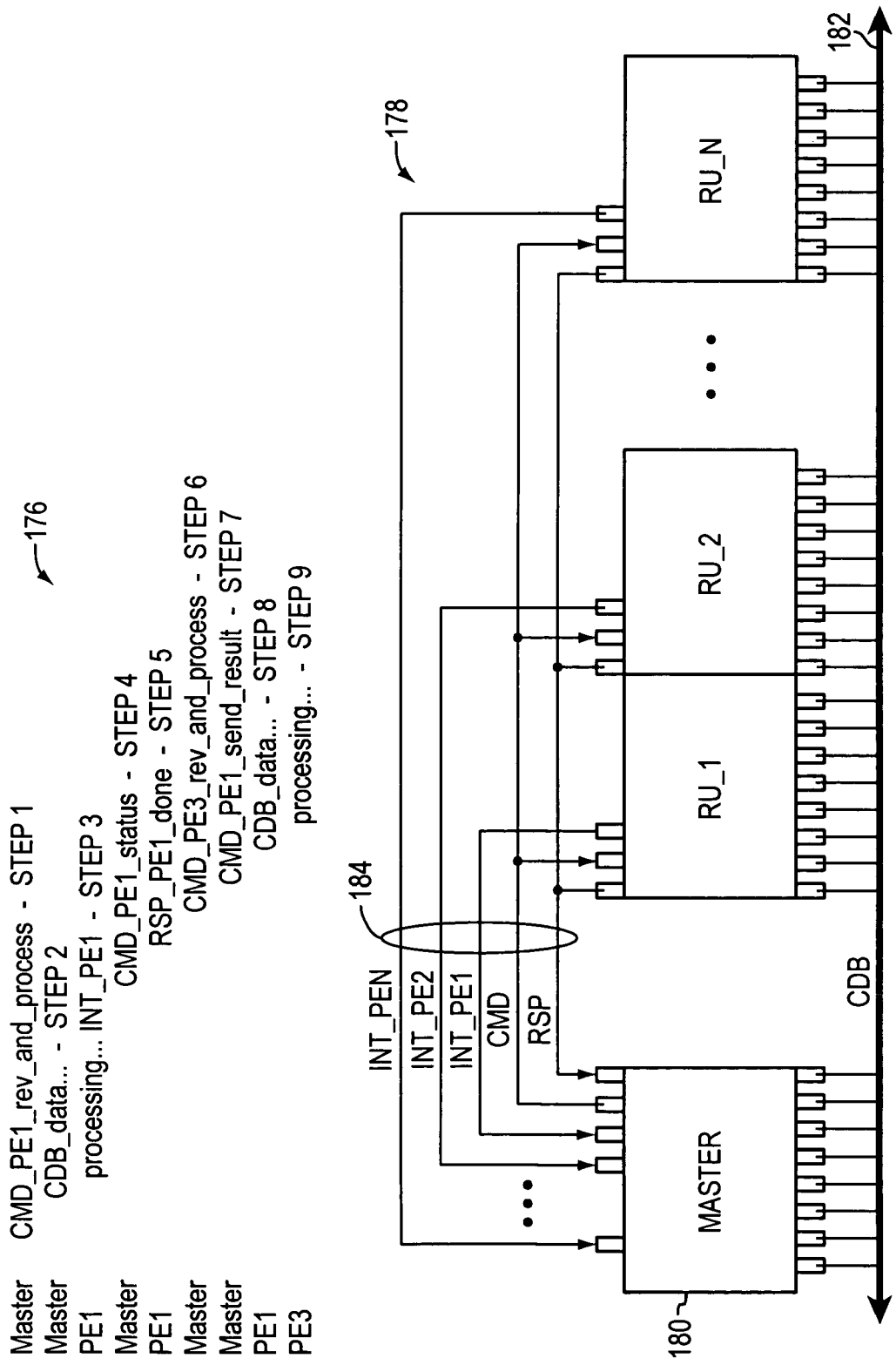
FIG. 9 is an illustrative example of communications between a master and a processing element in an embodiment of the invention.

An example of communications between a controller and reconfigurable units is shown in FIG. 9. This example is applicable to each of the embodiments concerning master/slave architecture that is described herein. Generally, in one embodiment, a processing element is a portion of a chip that is logically separated from other portions of the chip, i.e., the logic in a processing element doesn't directly interact with the logic in other processing elements. A reconfigurable unit may include one or more processing elements as discussed in greater detail with reference to FIGS. 10A-10C. FIG. 9 includes a sequence of commands 176 concerning a system 178 with a master controller 180 and a plurality of reconfigurable units RU_1 through RU_N. In the embodiment shown in FIG. 9, the system 178 identifies each reconfigurable unit RU1 through RU_N as a slave with a processing element number corresponding to the associated reconfigurable unit, i.e., processing element PE1 corresponds to the reconfigurable unit RU_1, processing element PE2 corresponds to the reconfigurable unit RU_2, etc. In another embodiment, a one to one relationship between reconfigurable units and processing elements does not exist, i.e., each reconfigurable unit includes more than one processing element. In a version of this embodiment, each processing element PE1-PEN is treated as an individual slave. In one embodiment, the reconfigurable units RU_1 through RU_N are included in a single chip. In another embodiment, the reconfigurable units RU_1 through RU_N are distributed across a plurality of chips. A common data bus 182 connects the master controller 180 to each of the reconfigurable units RU_1 through RU_N. A control bus 184 also connects the master controller 180 to each of the reconfigurable units RU_1 through RU_N. The control bus 184 includes a separate interrupt bus INT_PE1 through INT_PEN dedicated to each slave. The control bus 184 also includes a command bus CMD and a response bus RSP that are both common to each of the processing elements PE1-PEN.

At step 1, the master controller 180 issues a command to processing element PE1 to receive and process data from the common data bus 182. At step 2, the master controller 182 places the data on the common data bus 182. At step 3, processing element PE1 processes the data and sends an interrupt signal to the master controller 180. At step 4, the master controller 180 requests the status of processing element PE1. At step 5, processing element PE1 responds with an indication that it has completed processing the data from the common data bus 182. At step 6, the master controller 180 issues a command to processing element PE3 to receive and process data from the common data bus 182. At step 7, the master controller 180 sends a command to processing element PE1 instructing it to place on the common data bus 182 the results of the processing that occurred at step 3. At step 8, processing element PE1 places the data on the common data bus 182. At step 9, processing element PE3 processes the data from the common data bus 182. In a similar fashion, the reconfiguration of the reconfigurable units RU_1 through RU_N employed with a master/slave architecture can be initiated by the master controller 180 that monitors the status of the reconfigurable units RU_1 through RU_N and transmits the commands that result in reconfiguration of one or more reconfigurable units.

Figure 10:
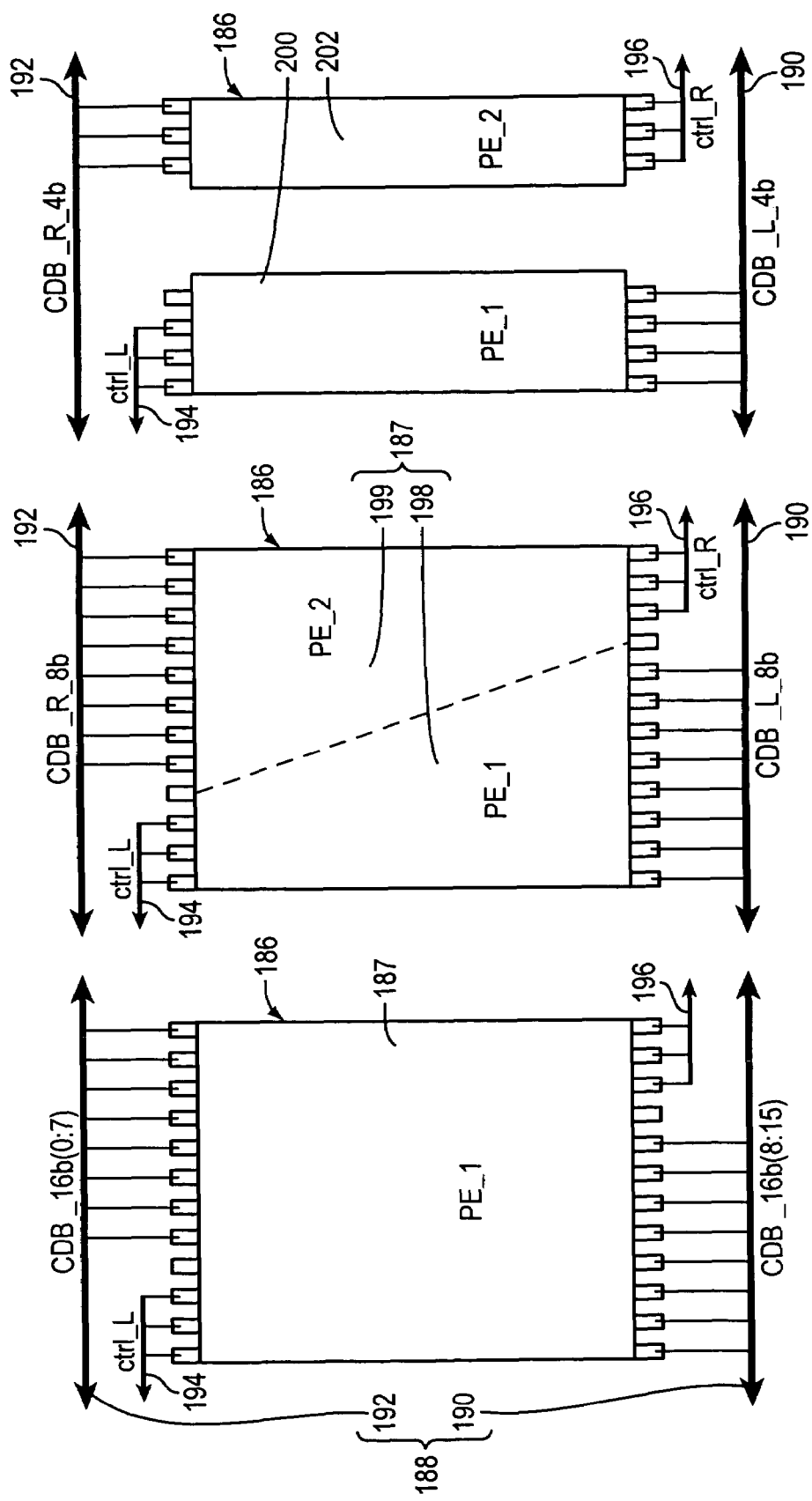
FIGS. 10A, 10B and 10C are block diagrams of processing elements according to an embodiment of the invention.

FIGS. 10A, 10B, and 10C demonstrate how processing elements may be distributed within a reconfigurable device. FIGS. 10A, 10B, and 10C also demonstrate how bus allocation and logic allocation can be modified as a result of the reconfiguration of a reconfigurable unit. As described above, a reconfigurable unit is independently reconfigured. FIG. 10A shows a reconfigurable device 186 in a first state where the device 186 includes a single reconfigurable unit 187. The reconfigurable unit 187 is a single processing element PE_1 because the logic gates that are in the reconfigurable unit 187 are logically connected to one another. In one embodiment, all the logic gates in the reconfigurable unit 187 are part of the same slave. In FIG. 10A, the reconfigurable device 186 is connected to a 16-bit common data bus 188. The common data bus 188 includes a first common data bus 190 of 8-bits and a second common data bus 192 also of 8-bits. A first control bus 194 and a second control bus 196 are also connected to the reconfigurable device 186. The reconfigurable device 186 receives control signals from a controller (not shown) via the control busses 194, 196. In a version of this embodiment, only one of the two control busses 194, 196 is used when the reconfigurable device 186 includes only one processing element PE_1.

In FIG. 10B, the reconfigurable device 186 is shown in a second state where it is partitioned into a first processing element 198 and a second processing element 199 included in reconfigurable unit 187. The two processing elements 198, 199 are logically separated, but are included within the same reconfigurable unit. Thus, the processing elements 198, 199 can operate independent of one another, however, they cannot be independently reconfigured. That is, both processing elements 198, 199 are reconfigured each time the reconfigurable unit 187 is reconfigured. As shown in FIG. 10B, each processing element 198, 199 maintains a connection to a control bus and a data bus. In one embodiment, the first processing element 198 is connected to the first common data bus 190, and the second processing element 199 is connected to the second common data bus 192. In addition, the first processing element 198 is connected to the first control bus 194, and the second processing element 199 is connected to the second control bus 196. As a result, each processing element 198, 199 is connected to an 8-bit data bus. When compared with the state shown in FIG. 10A, the data-bus-bandwidth per processing element has been reduced in half from 16-bits to 8-bits. The reconfiguration time, which is a function of the number of logic gates in a reconfigurable unit, has remained the same for the reconfigurable unit 187 because in each of FIGS. 10A and 10B a single reconfigurable unit 187 is included in the reconfigurable device 186. In general, partitioning as shown in FIG. 10B can continue for a reconfigurable device 186 (e.g., a chip) provided that a connection is maintained between each processing element 198, 199 and both a data bus 192, 196 and a control bus 194, 196.

FIG. 10C shows the reconfigurable device 186 of FIG. 10A in a third state. The reconfigurable device 186 now includes a first reconfigurable unit 200 and a second reconfigurable unit 202. Further, the reconfigurable units 200, 202 each include one processing element, i.e., PE_1, PE_2. The size of each reconfigurable unit 200, 202 will vary depending upon the reconfiguration. The arrow in the center of the figure represents the ability to adjust the width of the reconfigurable units 200, 202. In one embodiment, logic gates are turned off when they are not included in processing elements, i.e., PE_1, PE_2, as a result of reconfiguration. In the embodiment shown in FIG. 10B, the width of processing elements PE_1, PE_2 are varied as the width of the corresponding reconfigurable unit 200 or 202 is changed. The quantity of reconfigurable units (e.g., 200, 202) in the reconfigurable device 186 and the width of the reconfigurable units are flexible provided that each processing element (e.g., PE_1, PE_2) maintains a connection with a data bus (e.g., 190, 192) and a control bus (e.g., 194, 196), and the configuration of the first state is completely reconfigured by the second state. In the embodiment shown in FIG. 10C, reconfigurable unit 200 is connected to the first control bus 194 and the first common data bus 190. Reconfigurable unit 202 is connected to the second control bus 196 and the second common data bus 192. As a result of the width of the two reconfigurable units 200, 202 shown in FIG. 10C, each reconfigurable unit 200, 202 is connected to a 4-bit common data bus, i.e., 190, 192. In another embodiment, reconfigurable unit 200 is connected to a 12-bit common data bus and reconfigurable unit 202 is connected to a 4-bit common data bus. In another embodiment, the data busses 190, 192 can be either local data busses or I/O data busses. In a version of this embodiment, one of the data busses 190, 192 is a local data bus and the other data bus is an I/O data bus.

Figure 11:
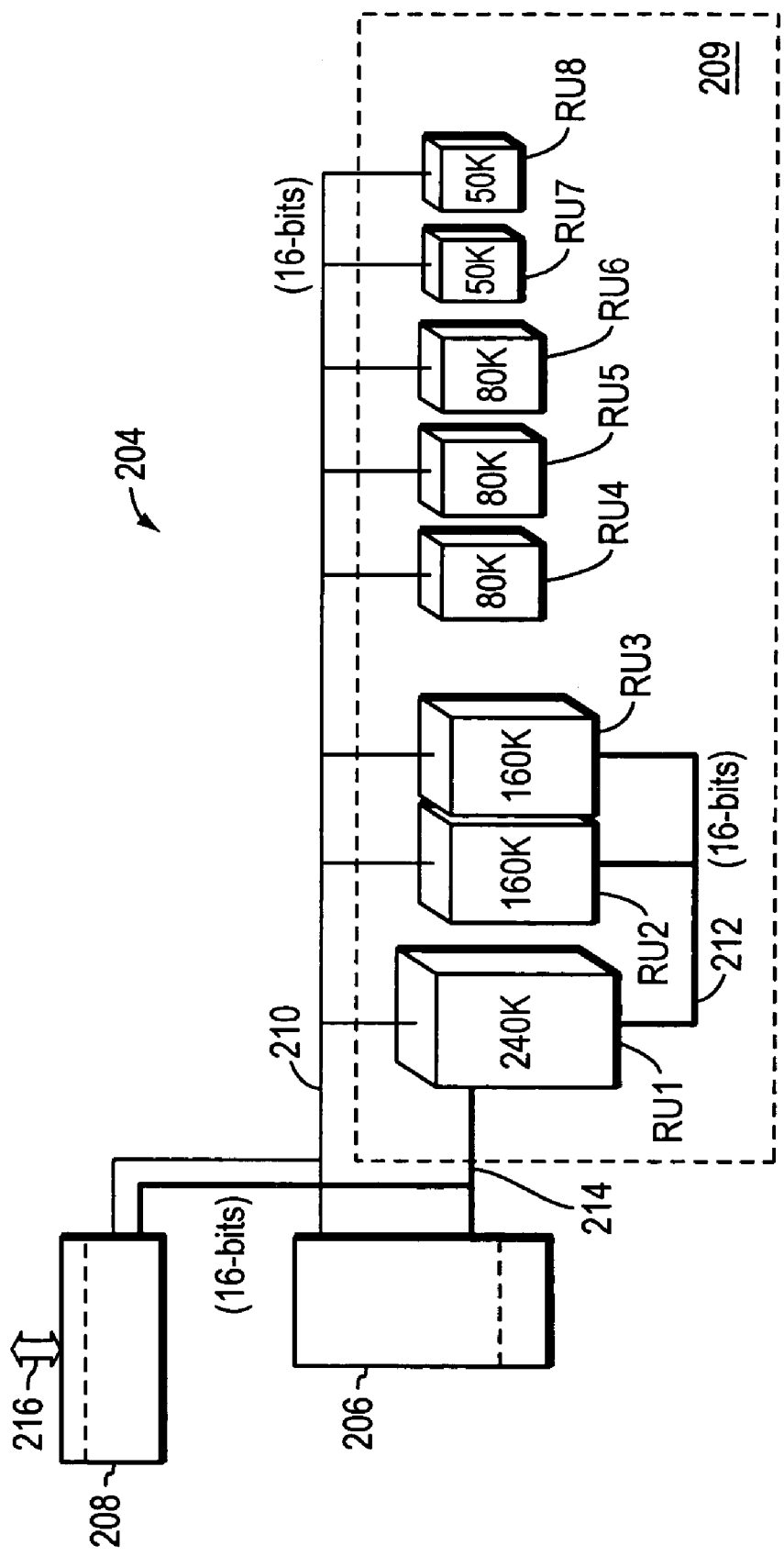
FIG. 11 is a block diagram of a system according to an embodiment of the invention where the system includes processing elements according to the embodiment shown in FIG. 10A.
Figure 12:
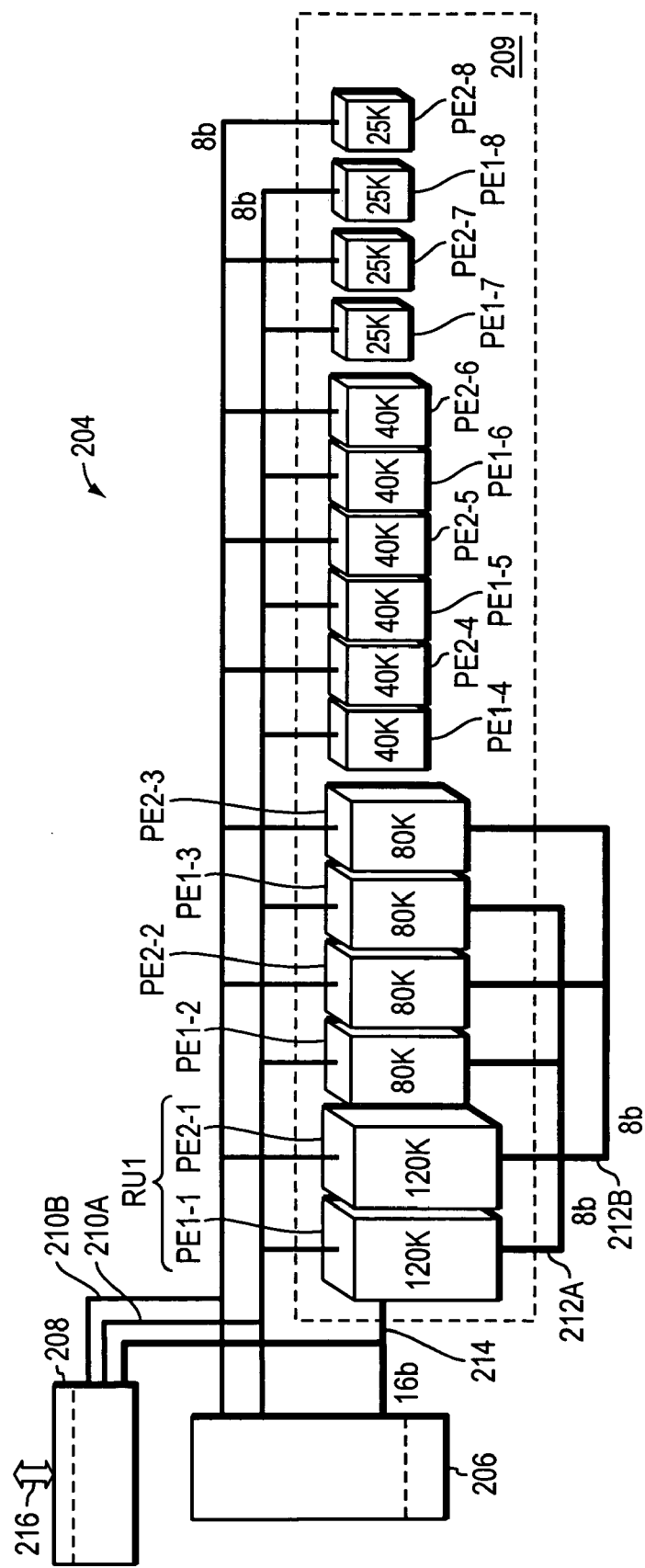
FIG. 12 is a block diagram of a system according to an embodiment of the invention where the system includes processing elements according to the embodiment shown in FIG. 10B.
Figure 13:
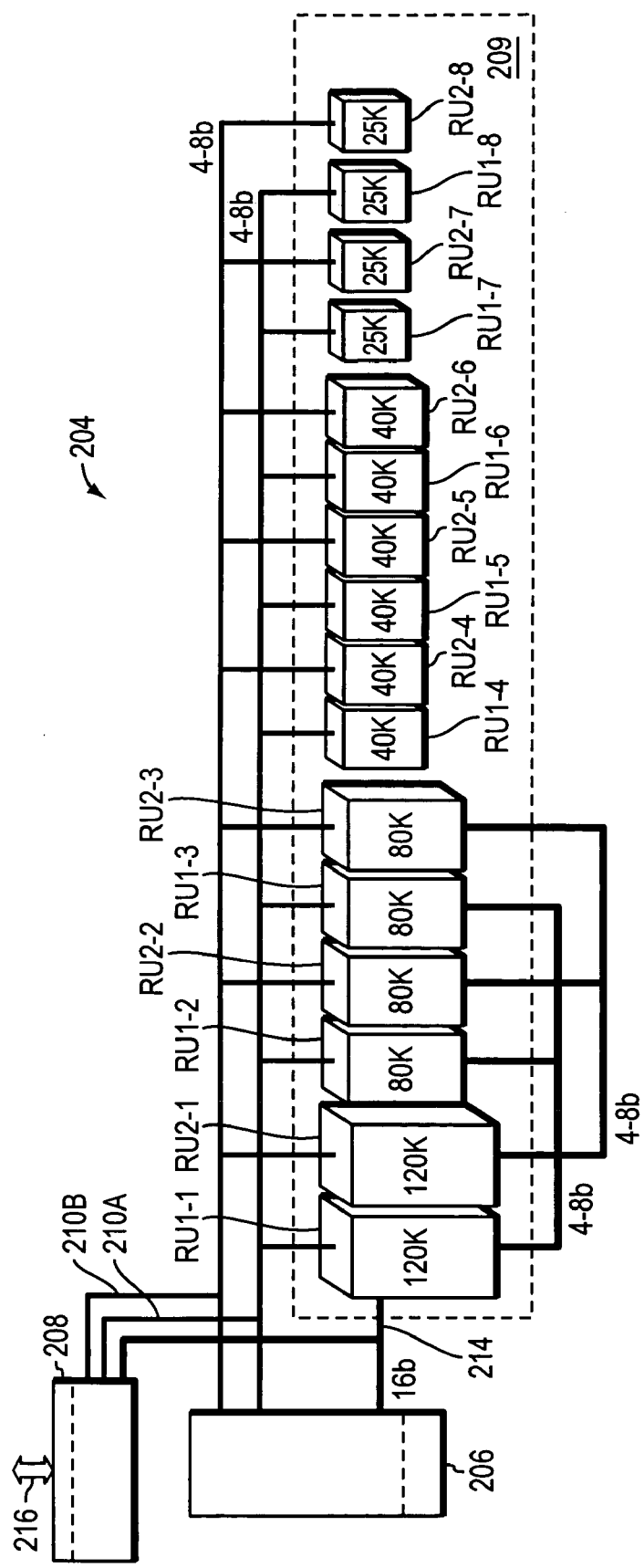
FIG. 13 is a block diagram of a system according to an embodiment of the invention where the system includes processing elements according to the embodiment shown in FIG. 10C.

Referring now to FIGS. 11, 12, and 13, the reconfiguration-states described in FIGS. 10A, 10B, 10C are shown in a system 204 including a device 209 and a plurality of reconfigurable units RU1-RU8. In one embodiment, the system 204 includes multiple devices 209. In general, FIG. 11 shows the device 209 and its associated reconfigurable units RU1-RU8 in the first state which was discussed with reference to FIG. 10A, FIG. 12 shows a system 204 with the device 209 and associated reconfigurable units RU1-RU8 in the second state discussed with reference to FIG. 10B (i.e., with RU1-RU8 each partitioned into multiple processing elements), and FIG. 13 shows a system 204 with the device 209 and associated reconfigurable units RU1-RU8 in the third state discussed with reference to FIG. 10C (i.e., partitioned into multiple reconfigurable units). The system 204 shown in FIG. 11 includes a controller 206, I/O 208, and a plurality of reconfigurable units RU1-RU8 included in the reconfigurable device 209 (e.g., a reconfigurable chip). Each reconfigurable unit RU1-RU8 is in the first state where it includes a single processing element. In the embodiment shown in FIG. 11, each reconfigurable unit RU1-RU8 includes a quantity of logic gates indicated by the label associated with the reconfigurable unit, e.g., RU1 includes 240K, RU2 includes 160K, RU4 includes 80K, etc. Because each reconfigurable unit RU1-RU8 includes a single processing element, each processing element includes all the logic gates associated with the corresponding reconfigurable unit. For example, the processing element corresponding to RU1 includes a quantity of 240K logic gates. A common data bus 210 connects the I/O 208 and the reconfigurable units RU1-RU8 to each other and to the controller 206. A local data bus 212 connects RU1, RU2, and RU3 to one another. An I/O data bus 214 connects the controller 206 to the I/O 208 and the reconfigurable unit RU1. As shown in FIG. 11, each data bus (i.e., 210, 212, 214) is a 16-bit bus. In a version of this embodiment, each data bus (i.e., 210, 212, 214) operates at 100 MHz. In one embodiment, the controller 206 includes static access random memory ("SRAM"). In a version of this embodiment, the controller 206 includes 12 Megabits of SRAM. In one embodiment, the I/O 208 is configurable I/O. A second I/O bus 216 connects the I/O 208 to additional modules, e.g., external memory. In a version of this embodiment, the second I/O bus is a 32-bit bus operating at 200 MHz.

FIG. 12 shows a system 204 including the device 209 with the eight reconfigurable units RU1-RU8 in a state where each reconfigurable unit is partitioned into two processing elements. Thus, there are total of eight reconfigurable units RU1-RU8 split into a total of 16 processing elements. In other embodiments, the reconfigurable units RU1-RU8 included in the device 209 are not evenly partitioned, i.e., some reconfigurable units may not be partitioned, some reconfigurable units may be partitioned into three or more processing elements, and some reconfigurable units may be partitioned in two with a distribution of logic gates that differs from the 50/50 split shown in FIG. 12. Each reconfigurable unit RU1-RU8 includes a processing element 1 and a processing element 2. In the embodiment shown in FIG. 12, reference characters PE1-1 through PE1-8 refer to processing element 1 of reconfigurable units RU1-RU8, respectively. Reference characters PE2-1 through PE2-8 refer to processing element 2 of reconfigurable units RU1-RU8, respectively. The processing elements PE1-1 through PE1-8 and PE2-1 through PE2-8 that are combined to form one of the reconfigurable units RU1-RU8 are combined in the manner shown in FIG. 12 for reconfigurable unit RU1. In the interest of clarity, the combinations of processing elements PE1-2 through PE1-8 and PE2-2 through PE2-8 that appear in FIG. 12 and result in RU2-RU8 are not labeled.

In the embodiment shown in FIG. 12, each processing unit PE1-1 through PE1-8 and PE2-1 through PE2-8 includes one half of the total quantity of logic gates included in the corresponding reconfigurable unit. Thus, PE1-1 and PE2-1, corresponding to reconfigurable unit RU1, each include 120K of logic gates as indicated by the label associated with the processing element. As a result of the reconfiguration that changes the reconfigurable devices to the second state shown in FIGS. 10B and 12, the common data bus 210 is split into two 8-bit busses 210A and 210B. Similarly, the local data bus 212 is also split into two 8-bit busses 212A and 212B. In FIG. 12, the I/O data bus 214 is not split as a result of the reconfiguration. In another embodiment, the I/O data bus 214 is split into two 4-bit busses as a result of reconfiguration. In one embodiment, the busses 210, 212, and 214 are not evenly split as a result of the reconfiguration.

FIG. 13 shows a system 204 where each of the original reconfigurable units RU1-RU8 (shown in FIG. 11) are in a state where they each have been partitioned into two reconfigurable units, e.g., RU1 is partitioned into RU1-1 and RU2-1. Thus, there are total of sixteen reconfigurable units RU1-1 through RU1-8 and RU2-1 through RU2-8 associated with the eight reconfigurable devices. In the embodiment shown in FIG. 13, reference characters RU1-1 through RU1-8 refer to reconfigurable unit 1 of reconfigurable devices 1-8, respectively. Reference characters RU2-1 through RU2-8 refer to reconfigurable unit 2 of reconfigurable devices 1-8, respectively. In the embodiment shown in FIG. 13, each reconfigurable unit RU1-1 through RU1-8 and RU2-1 through RU2-8 include a single processing element. In another embodiment, one or more of the reconfigurable units RU1-1 through RU1-8 and RU2-1 through RU2-8 include multiple processing elements.

In the embodiment shown in FIG. 13, each reconfigurable unit RU1-1 through RU1-8 and RU2-1 through RU2-8 include one half of the total quantity of logic gates included in the corresponding reconfigurable device. Thus, RU1-1 and RU2-1, corresponding to a first reconfigurable device, each include a quantity of 120K logic gates as indicated by the label associated with the reconfigurable units, i.e., one half of the 240K logic gates included in the first reconfigurable device. In other embodiments, the original reconfigurable units RU1-RU8 are not evenly partitioned. As a result, in other embodiments, some reconfigurable units RU1-RU8 may not be partitioned, some of the original reconfigurable units RU1-RU8 may be partitioned into three or more reconfigurable units, and some reconfigurable units RU1-RU8 may be partitioned in two with a distribution of logic gates that differs from the 50/50 split shown in FIG. 13. As a result of the reconfiguration that changes the reconfigurable units to the third state shown in FIGS. 10C and 13, the common data bus 210 is split into two 4-bit busses 210A and 210B. Similarly, the local data bus 212 is also split into two 4-bit busses 212A and 212B. In FIG. 13, the I/O data bus 214 is not split as a result of the reconfiguration. In another embodiment, the I/O data bus 214 is split into two 4-bit busses as a result of reconfiguration. In one embodiment, the busses 210, 212, and 214 are not evenly split as a result of the reconfiguration.

Figure 14B:
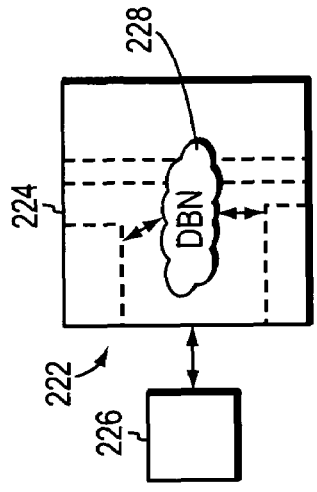
FIGS. 14A, 14B and 14C are block diagrams of data bus networks according to embodiments of the invention.
Figure 14A:
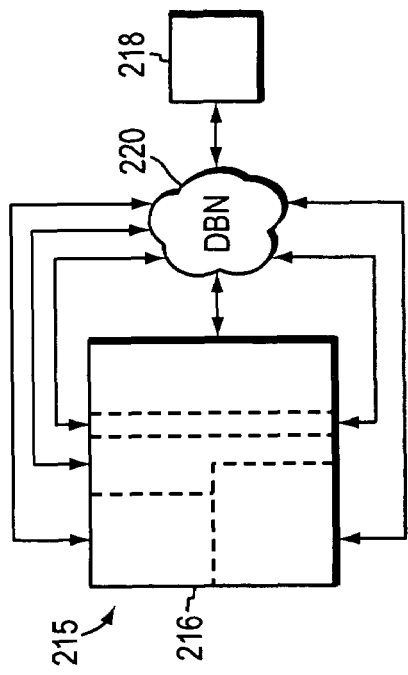
Figure 14C:
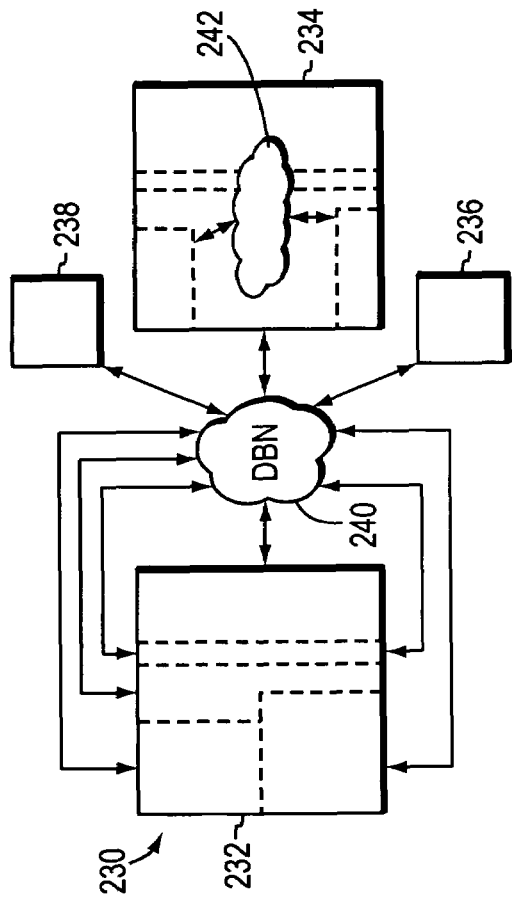

FIGS. 14A, 14B, and 14C show three different embodiments of the data bus network employed with one or more reconfigurable devices. In FIG. 14A, a system 215 includes a reconfigurable device 216, a controller 218, and a data bus network 220. In a version of the embodiment shown in FIG. 14A, the reconfigurable device 216 is a chip which includes a plurality of reconfigurable units. The data bus network 220 connects the reconfigurable device 216 to the controller 218. In the embodiment shown in FIG. 14A, the data bus network 220 is external to the reconfigurable device 216. In a version of the embodiment shown in FIG. 14A, the reconfigurable device 216 includes multiple processing elements which are connected to the controller 218 by the data bus network 220.

In FIG. 14B, a system 222 includes a reconfigurable device 224, a controller 226, and a data bus network 228. In a version of the embodiment shown in FIG. 14B, the reconfigurable device 224 is a chip which includes a plurality of reconfigurable units. The data bus network 228 connects the reconfigurable device 224 to the controller 226. In the embodiment shown in FIG. 14B, the data bus network 228 is internal to the reconfigurable device 224. In a version of the embodiment shown in FIG. 14B, the reconfigurable device 224 includes multiple processing elements which are connected to the controller 226 by the data bus network 228.

In FIG. 14C, a system 230 includes a first reconfigurable device 232, a second reconfigurable device 234, a third reconfigurable device 236, a controller 238, and a first data bus network 240, and a second data bus network 242. In a version of the embodiment shown in FIG. 14C, one or more of the reconfigurable devices 232, 234, and 236 are chips which include a plurality of reconfigurable units. The first data bus network 240 connects each of the reconfigurable devices 232, 234, and 236 to one another and to the controller 226. The first data bus network 240 is external to the reconfigurable devices 232, 234, 236. In addition, in the embodiment shown in FIG. 14C, the second reconfigurable device 234 includes the second data bus 242 which is internal to reconfigurable device 234. In a version of the embodiment shown in FIG. 14C, the reconfigurable device 232, 234, 236 include multiple processing elements which are connected to the controller 238 by the first data bus network 240 (and, in the case of the second reconfigurable device 234, by the second data bus network 242).

The systems described herein provide, generally, an application specific computer advantageous for a wide variety of applications, including those whose application may change over time. In addition, the systems described herein can provide an application specific computer in a small form factor. For example, the systems and methods described herein can be employed to provide a computer that dynamically (i.e., during runtime) determines the systems resource requirements and determines which resources to reconfigure. Such an approach may be referred to as "hardware caching" because, in a manner similar to "software caching," processing activity is monitored to make intelligent runtime decisions on which reconfigurable units to keep and which ones to replace or otherwise reconfigure. The systems described herein are particularly advantageous for applications that have significant digital signal processing requirements especially those applications that employ multiple processing tasks. Further, the systems described herein allow the reduction of the digital parts counts of a system because devices can be repeatedly reconfigured during runtime in order to perform different tasks.

A handheld apparatus that performs multiple tasks provides one example where the systems described herein may be particularly advantageous. Specifically, the systems described herein enable a single handheld apparatus (e.g., personal digital assistant), for example, to be reconfigured to operate as a cell phone, a GPS receiver, a video recorder and image compressor, a gaming terminal, and a text scanner. An autonomous robotic device provides an example of, generally, a physically small apparatus that is required to perform multiple tasks. More specifically, such a device may receive a GPS signal to identify its coordinates and then be required to employ sensors to gather environmental data, and then, compress, encrypt and transmit the data to a nearby receiver. Current designs include multiple chips to handle the processing required to complete these tasks. In one embodiment of the systems described herein, a device includes a single chip that is reconfigured as required to perform each of the listed tasks. In another embodiment of the systems described herein, one or more of the tasks are completed using multiple hardware configurations, i.e., a reconfigurable device may be wholly or partially reconfigured more than once to execute the functions that must be completed to complete the task. In a version of this embodiment, a system includes a single device that is partially reconfigured in order to perform multiple functions. Partial reconfiguration required for one or more of the functions occurs while the device executes other functions associated with the task. In one embodiment, functions associated with multiple tasks are executed in parallel while the device is partially reconfigured.

In a system according to one embodiment of the invention, an application includes a protocol that requires a reconfigurable device perform multiple functions. Some of the functions may occur in parallel. The protocol is first profiled and partitioned into hardware tasks and software tasks. An optimization tool (e.g., a smart compiler) is employed to schedule and map the hardware tasks corresponding to the functions. The hardware tasks are mapped to the reconfigurable device in order to minimize reconfiguration overhead, e.g., the amount of time that portions of the device are unavailable for processing because they are being reconfigured. Considerations for hardware optimization include the protocol execution time, the device's energy consumption and the device size. Then, during runtime, the device (e.g., a FPGA) is automatically reconfigured based upon the schedule and the mapping. In a version of this embodiment, the reconfigurations are partial reconfigurations. Dataflow and processing continues throughout the device except in the section or sections that are actively being reconfigured.

Additional applications where the systems described herein can be advantageously employed include audio/video recognition systems and encryption/decryption systems. Systems for video recognition can, for example, rapidly capture an image with a camera and compare the image against possible matching images. Because the systems described herein can reconfigure the hardware used to process the image, these systems can perform the required operations orders of magnitude times more quickly than systems that employ multiple non-reconfigurable processing elements. In general, systems for encryption/decryption require a substantial amount of dedicated resources that are used intermittently. For example, a robot may capture video images, compress the video images, encrypt the video images, and transmit the encrypted images. Using a reconfigurable device, a system in accordance with an embodiment of the invention could temporarily reconfigure itself into logic that performs the separate resource intensive parts of the algorithm(s) that are used to capture, compress, encrypt and transmit the video image.

While the invention has been shown and described with reference to specific embodiments, it should be understood by those of ordinary skill in the art that various changes in form and detail may be made therein without departing from the spirit and scope of the invention.

What is claimed is:

1. A processing system, comprising:
    individually reconfigurable units that are part of a single chip, wherein each of the reconfigurable units includes a plurality of logic gates that during runtime can be further partitioned into a first processing element and a second processing element or re-combined with a second plurality of logic gates of another reconfigurable unit to form a third processing element, wherein the first, second, and third processing elements have quantities of logic gates based on processing tasks, at least one of the processing elements being reconfigurable during runtime and operating independently of other processing elements in the system, and at least two of the processing elements being logically separate and not interacting directly with each other;
    one or more common data buses to facilitate data exchange between the reconfigurable units and an input/output (I/O) module; and
    one or more local data buses in electrical communication among the reconfigurable units, the one or more local data buses being reconfigurable during runtime to dynamically reallocate bandwidth among the processing elements based at least in part on said partitioning or re-combination of the logic gates, each local bus, when configured, being dedicated to interconnecting two or more of the processing elements.

2. The system as claimed in claim 1 wherein the one or more common data buses are part of the single chip.

3. The system as claimed in claim 1 wherein the one or more common data buses are external to the single chip.

4. The system as claimed in claim 1, further comprising a first reconfigurable unit and a second reconfigurable unit,
    wherein the first reconfigurable unit communicates to the second reconfigurable unit over a local data bus,
    wherein the local data bus has a first bandwidth when the first reconfigurable unit is in a first state, and
    wherein the local data bus has a second bandwidth when the first reconfigurable unit is in a second state.

5. The system as claimed in claim 1, further comprising a controller and a memory module, wherein each of the controller and the memory module are in electrical communication with the one or more common data buses.

6. The system as claimed in claim 5 wherein each of the controller and the I/O module are external to the single chip.

7. The system as claimed in claim 1, further comprising a controller,
    wherein a first allocated portion of a common data bus is in electrical communication with the controller, the I/O module, and the reconfigurable units, and
    wherein a second allocated portion of the common data bus is in electrical communication with the controller, the I/0 module, and at least one reconfigurable unit.

8. The system as claimed in claim 7, wherein a third allocated portion of the common data bus is in electrical communication with at least two of the reconfigurable unit, and
    wherein the third allocated portion of the common data bus is dedicated to communication between said at least two reconfigurable unit.

9. The system as claimed in claim 8, further comprising a control bus, wherein the control bus is in electrical communication with the controller, the I/O module, and the logic segments.

10. The system as claimed in claim 1, further comprising a plurality of chips, wherein individually reconfigurable units are part of the chips.

11. The system as claimed in claim 5 wherein access to the one or more common data buses is arbitrated among the reconfigurable units and the I/O module.

12. A method for processing that employs a system comprising a controller, a memory, and a single chip comprising a plurality of reconfigurable units, the method comprising the steps of:
    transmitting a control signal from the controller to a first group of one or more reconfigurable units while at least one other reconfigurable unit is in operation, the control signal including data associated at least one function;

in response to the control signal, pulling configuration data for the first group of reconfigurable units from the memory;

with the configuration data, reconfiguring the first group of reconfigurable units to a first state, the reconfiguring including partitioning a plurality of logic gates in a first reconfigurable unit into at least a first processing element and a second processing element or re-combining one or more portions of the plurality of logic gates with some or all logic gates of a second reconfigurable unit to form a third processing element, wherein the first, second and third processing elements have quantities of logic gates based on the at least one function, at least one of the processing elements being reconfigurable during runtime and operating independently of other processing elements in the system, and at least two of the processing elements being logically separate and not interacting directly with each other;

arranging or assigning conductors among the first group of reconfigurable units to reallocate bandwidth of at least one local bus to the processing elements based at least in part on the runtime partitioning or re-combination of the reconfigurable units, each local bus, when configured, being dedicated to interconnecting two or more of the processing elements;

wherein the processing elements execute the at least one function when in the first state, and wherein the reconfigurable units are individually reconfigurable during runtime and are in electrical communication with a common data bus.

13. The method according to claim 12, further comprising the step of:

reconfiguring a second group of one or more reconfigurable units while the first group of reconfigurable units executes the at least one function.

14. The method according to claim 12, the reconfiguring step further comprising the step of:

combining a first reconfigurable unit with a second reconfigurable unit.

15. The method according to claim 12, the reconfiguring step further comprising the step of:

partitioning at least one reconfigurable unit into two or more individually reconfigurable units.

16. The method according to claim 12, the reconfiguring step further comprising the step of:

changing a bandwidth of the common data bus.

17. The method according to claim 16 wherein the common data bus is external to the single chip.

18. A single-chip FPGA comprising:

a plurality of individually reconfigurable units that are part of a single chip;

an I/O segment; and a controller dedicated to reconfigure the reconfigurable units during runtime and to coordinate the reconfigurable units in performing their respectively programmed functions, wherein the controller initiates reconfiguration of a first group of reconfigurable units while a second group of reconfigurable units are still executing instructions, wherein the reconfiguration causes a plurality of logic gates of at least one reconfigurable unit in the first group of reconfigurable units to be partitioned into a first processing element and a second processing element and/or re-combined with another reconfigurable unit to form a third processing element, wherein the first, second and third processing elements have quantities of logic gates based on processing tasks, at least one of the processing elements being reconfigurable during runtime and operating independently of other processing elements, and at least two of the processing elements being logically separate and not interacting directly with each other, and wherein the reconfiguration further reallocates bandwidth of at least one of a common data bus and a local data bus based at least in part on the partitioning or re-combination of reconfigurable units, the local bus being dedicated to interconnecting to or more of the processing elements.

19. The FPGA according to claim 18 wherein the data bus is in electrical communication with the reconfigurable units, the I/O segment, and the controller.

20. The FPGA according to claim 19 wherein a bandwidth of the data bus employed by the at least one reconfigurable unit is greater when the at least one reconfigurable unit is in a second configuration than when the at least one reconfigurable unit is in a first configuration.

21. The FPGA according to claim 19 wherein a quantity of logic gates in the at least one reconfigurable unit is greater when the at least one reconfigurable unit is in a second configuration than when the at least one reconfigurable unit is in a first configuration.

22. A method for performing multiple tasks comprising a plurality of functions, the method comprising the steps of:

providing a device comprising a plurality of reconfigurable units on a single chip;

programming the device into a first configuration by partitioning a plurality of logic gates in at least one reconfigurable unit into a first processing element and a second processing element or combining plurality of logic gates with logic gates of another reconfigurable unit to form a third processing element, wherein the first, second and third processing elements have quantities of logic gates based on processing tasks, at least one of the processing elements being reconfigurable during runtime and operating independently of other processing elements in the single chip, and at least two of the processing elements being logically separate and not interacting directly with each other;

with the logic in the first configuration, starting the execution of at least a first function and a second function, each function being performed by at least one processing elements; and upon completion of the first function, reconfiguring a portion of the device by partitioning and re-combining logic gates within corresponding reconfigurable units or portions thereof to form at least one new processing element and further by reallocating one or more local data buses among the corresponding reconfigurable units or the at least one new processing element, each local bus, when configured, being dedicated to interconnecting two or more processing elements, wherein the second function continues to be executed during at least a portion of the reconfiguring step.

23. The method according to claim 22 wherein a third function begins execution while the second function continues to be executed.

* * * * *

UNITED STATES PATENT AND TRADEMARK OFFICE
CERTIFICATE OF CORRECTION

PATENT NO. : 7,669,035 B2
APPLICATION NO. : 11/040177
DATED : February 23, 2010
INVENTOR(S) : Young et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 342 days.

Signed and Sealed this

Twenty-eighth Day of December, 2010

David J. Kappos
*Director of the United States Patent and Trademark Office*